United States Patent
Mizusaki et al.

(10) Patent No.: US 8,679,595 B2
(45) Date of Patent: Mar. 25, 2014

(54) LIQUID CRYSTAL DISPLAY AND METHOD FOR PRODUCING THE SAME

(75) Inventors: Masanobu Mizusaki, Osaka (JP); Yohei Nakanishi, Osaka (JP)

(73) Assignee: Sharp Kabushiki Kaisha, Osaka (JP)

( * ) Notice: Subject to any disclaimer, the term of this patent is extended or adjusted under 35 U.S.C. 154(b) by 189 days.

(21) Appl. No.: 13/131,700

(22) PCT Filed: Jun. 25, 2009

(86) PCT No.: PCT/JP2009/002931
§ 371 (c)(1),
(2), (4) Date: May 27, 2011

(87) PCT Pub. No.: WO2010/061490
PCT Pub. Date: Jun. 3, 2010

(65) Prior Publication Data
US 2011/0222005 A1 Sep. 15, 2011

(30) Foreign Application Priority Data
Nov. 27, 2008 (JP) ................................. 2008-303176

(51) Int. Cl.
*G02F 1/1337* (2006.01)

(52) U.S. Cl.
USPC ........................... 428/1.2; 428/1.26; 349/123

(58) Field of Classification Search
USPC .......... 428/1.2, 1.25–1.26; 349/123–124, 135
See application file for complete search history.

(56) References Cited

U.S. PATENT DOCUMENTS

| | | |
|---|---|---|
| 2007/0121045 | 5/2007 | Kim et al. |
| 2003/0087045 A1* | 5/2003 | Nakata et al. ................ 428/1.27 |
| 2004/0048004 A1* | 3/2004 | Hosaka et al. ............... 428/1.26 |
| 2004/0158030 A1* | 8/2004 | Okada ........................... 528/353 |
| 2005/0116200 A1* | 6/2005 | Nakanishi et al. ........ 252/299.01 |
| 2006/0051524 A1 | 3/2006 | Gibbons et al. |
| 2008/0160222 A1* | 7/2008 | Harding et al. .............. 428/1.26 |
| 2009/0040406 A1* | 2/2009 | Ong ................................. 349/37 |
| 2011/0199566 A1 | 8/2011 | Mazusaki et al. |

FOREIGN PATENT DOCUMENTS

| | | |
|---|---|---|
| JP | 11-352486 | 12/1999 |
| JP | 2001-004986 | 1/2001 |
| JP | 2006-215184 | 8/2006 |
| JP | 2008-076950 | 4/2008 |
| JP | 2010-107536 | 5/2010 |
| WO | WO 2010/047011 | 4/2010 |

OTHER PUBLICATIONS

JPO Website Machine English Translation of JP 2008-076950, Nakamura et al., Apr. 3, 2008.*

(Continued)

*Primary Examiner* — Sophie Hon
(74) *Attorney, Agent, or Firm* — Nixon & Vanderhye P.C.

(57) ABSTRACT

A liquid crystal display device (100) according to the present invention includes: an active matrix substrate (220) having a pixel electrode (224); a counter substrate (240) having a counter electrode (244); a vertical-alignment type liquid crystal layer (260); and alignment sustaining layers (210, 230) provided between the active matrix substrate (220) and the liquid crystal layer (260) and between the counter substrate (240) and the liquid crystal layer (260). The alignment sustaining layers (210, 230) contain a polymerization product (poa) resulting from polymerization of a polyfunctional monomer. At least one of the active matrix substrate and the counter substrate further includes an alignment film (110, 120) located on the liquid crystal layer side, the alignment film (110, 120) containing polyimide (pi) and a polymerization product (pob) resulting from polymerization of a polyfunctional monomer.

18 Claims, 7 Drawing Sheets

(56) References Cited

OTHER PUBLICATIONS

JPO Website Machine English Translation of JP 2001-027759, Kataoka et al., Jan. 30, 2001.*

English translation of the International Preliminary Report on Patentability mailed Jul. 14, 2011 in corresponding PCT Application No. PCT/JP2009/002931.

International Search Report mailed Sep. 29, 2009 in PCT Application No. PCT/JP2009/002931.

Lee, Y., et al., "*Liquid Crystal Alignment control Using Reactive Mesogen Mixed with Alihnment Layers*," IDW'09, pp. 747-750.

Kwak, M, et al., "*Observation of Hybrid Type Alignment Film in TFT-LCD*," Proceeding of 2007 Japanese Liquid Crystal Society Annual Meeting, Sep. 2007, PA03, p. 138.

Supplementary European Search Report issued in Application Serial No. 09 82 8740 dated Jun. 19, 2012.

* cited by examiner (a)

(b)

(c)

(a)

(b)

(c)

(d)

LIQUID CRYSTAL DISPLAY AND METHOD FOR PRODUCING THE SAME

This application is the U.S. national phase of International Application No. PCT/JP2009/002931, filed 25 Jun. 2009, which designated the U.S. and claims priority to JP Application No. 2008-303176, filed 27 Nov. 2008, the entire contents of each of which are hereby incorporated by reference.

TECHNICAL FIELD

The present invention relates to a liquid crystal display device and a method of producing the same.

BACKGROUND ART

Liquid crystal display devices are used not only as small-sized display devices, e.g., the display sections of mobile phones, but also as large-sized television sets. Liquid crystal display devices of the TN (Twisted Nematic) mode, which have often been used conventionally, have relatively narrow viewing angles. In recent years, however, liquid crystal display devices with wide viewing angles have been produced, e.g., the IPS (In-Plane Switching) mode and the VA (Vertical Alignment) mode. Among such modes with wide viewing angles, the VA mode is adopted in a large number of realize a high contrast ratio.

As one kind of VA mode, the MVA (Multi-domain Vertical Alignment) mode is known, under which a plurality of liquid crystal domains are created in one pixel region. An MVA-mode liquid crystal display device includes alignment regulating structures provided on the liquid-crystal-layer side of at least one of a pair of opposing substrates, between which a vertical-alignment type liquid crystal layer is interposed. The alignment regulating structures may be linear slits (apertures) or ribs (protruding structures) that are provided on electrodes, for example. The alignment regulating structures provide alignment regulating forces from one side or both sides of the liquid crystal layer, thus creating a plurality of liquid crystal domains (typically four liquid crystal domains) with different alignment directions, whereby the viewing angle characteristics are improved.

Also known as one kind of VA mode is the CPA (Continuous Pinwheel Alignment) mode. In a generic liquid crystal display device of the CPA mode, pixel electrodes of a highly symmetrical shape are provided, and on a counter electrode, protrusions are provided corresponding to the centers of liquid crystal domains. These protrusions are also referred to as rivets. When a voltage is applied, in accordance with an oblique electric field which is created with the counter electrode and a highly symmetrical pixel electrode, liquid crystal molecules take an inclined alignment of a radial shape. Moreover, the inclined alignment of the liquid crystal molecules are stabilized due to the alignment regulating forces of side slopes of the rivets. Thus, the liquid crystal molecules in one pixel are aligned in a radial shape, thereby improving the viewing angle characteristics.

Unlike in TN-mode liquid crystal display devices in which the pretilt direction of liquid crystal molecules is regulated by an alignment film, alignment regulating forces in an MVA-mode liquid crystal display device are applied to the liquid crystal molecules by linear slits or ribs. Therefore, depending on distances from the slits and ribs, the alignment regulating forces for the liquid crystal molecules within a pixel region will differ, thus resulting in differing response speeds of the liquid crystal molecules within the pixel. Similarly, also in the CPA mode, the response speeds of the liquid crystal molecules will differ within the pixel, and the differences in response speed will become more outstanding as the pixel electrodes increase in size. Furthermore, in a VA-mode liquid crystal display device, the light transmittance in the regions in which slits, ribs, or rivets are provided is low, thus making it difficult to realize a high luminance.

In order to avoid the above problems, use of an alignment film for applying alignment regulating forces to liquid crystal molecules in a VA-mode liquid crystal display device is also known, such that the liquid crystal molecules will tilt from the normal direction of a principal face of the alignment film in the absence of an applied voltage (see, for example, Patent Document 1). The alignment film regulates the liquid crystal molecules so that the liquid crystal molecules are inclined from the normal direction of a principal face thereof even in the absence of an applied voltage, whereby an improvement in response speed is realized. Furthermore, since the alignment film regulates the pretilt azimuth of liquid crystal molecules so that the liquid crystal molecules within one pixel will be symmetrically aligned, the viewing angle characteristics are improved. In a liquid crystal display device disclosed in Patent Document 1, four liquid crystal domains are formed in a liquid crystal layer in accordance with a combination of two alignment regions of a first alignment film and two alignment regions of a second alignment film, whereby a wide viewing angle is realized.

However, a liquid crystal display device that has a pretilt conferred thereto may not have adequate long-term reliability. Therefore, use of a Polymer Sustained Alignment Technology (hereinafter referred to as the "PSA technique") to improve the long-term reliability is known (see Patent Document 2, for example). The PSA technique is a technique where a small amount of polymerizable compound (e.g., a polymerizable monomer) is mixed in a liquid crystal material, and after the liquid crystal material is introduced between an active matrix substrate and a counter substrate, the polymerizable compound is irradiated with ultraviolet light to form a polymerization product while applying a voltage between the pixel electrodes and the counter electrode. By using the PSA technique, the alignment state of the liquid crystal molecules when generating the polymerization product is maintained (stored), thus making it possible to control the pretilt direction of the liquid crystal molecules.

CITATION LIST

Patent Literature

[Patent Document 1] Japanese Laid-Open Patent Publication No. 11-352486
[Patent Document 2] Japanese Laid-Open Patent Publication No. 2008-076950

SUMMARY OF INVENTION

Technical Problem

Generally speaking, when a liquid crystal display device keeps displaying the same pattern for a long time, the previous pattern may remain even after the displayed image is changed. Such a phenomenon is also called image sticking. For example, after displaying white in a partial region of the screen and black in another region for a long time, if the entire liquid crystal panel is caused to display the same intermediate gray scale level, the region previously displaying white may appear slightly brighter than the region previously displaying black.

One cause of such image sticking is charge accumulation. The amount of charge accumulated in the region which was displaying black is different from the amount of charge accumulated in the region which was displaying white, and an electric field occurs because impurity ions in the liquid crystal accumulate at the interface between the alignment film and the liquid crystal layer. Therefore, when entirely switched to the same gray scale level, different voltages are applied to the layers of liquid crystal in the respective regions which were displaying white and black, thus being perceived as image sticking.

Image sticking caused by such charge accumulation can be somewhat suppressed by applying voltages of inverted polarities to the respective pixels. An image sticking caused by charge accumulation is also called DC image sticking, and the driving which involves applying voltages of inverted polarities for the sake of suppressing DC image sticking is also called polarity inversion driving. Strictly speaking, even with polarity inversion driving, it is difficult to apply voltages of completely symmetric polarities and thus a resultant image sticking may be perceived as flickering.

Moreover, image sticking will also occur when minute changes in the pretilt angle occur. When the pretilt angle changes, the V-T characteristics are affected, and thus the transmittance will vary even if the same voltage is applied. Since the applied voltage when displaying white is different from the applied voltage when displaying black, the amount of change in the pretilt angle will vary depending on the applied voltage. When later entirely switched to the same gray scale level, image sticking may be perceived due to changes in the pretilt angle. This is considered to be because the tilt of the liquid crystal molecules increases (i.e., the pretilt angle decreases) as the applied voltage increases. Such image sticking cannot be suppressed even by performing polarity inversion driving, and is also called AC image sticking. As is also disclosed in Patent Document 2, by using the aforementioned PSA technique, it is possible to suppress AC image sticking to a certain extent. However, some image sticking may still persist even if a polymerization product is formed from a monomer which is mixed in the liquid crystal material.

The present invention has been made in view of the above problems, and an objective thereof is to provide a liquid crystal display device whose image sticking is suppressed and a method of producing the same.

Solution to Problem

A liquid crystal display device according to the present invention is a liquid crystal display device comprising: an active matrix substrate having a pixel electrode; a counter substrate having a counter electrode; a vertical-alignment type liquid crystal layer provided between the active matrix substrate and the counter substrate; and alignment sustaining layers provided between the active matrix substrate and the liquid crystal layer and between the counter substrate and the liquid crystal layer, the alignment sustaining layers containing a polymerization product resulting from polymerization of a polyfunctional monomer, wherein, at least one of the active matrix substrate and the counter substrate further includes an alignment film; and the alignment film contains polyimide and a polymerization product resulting from polymerization of a polyfunctional monomer.

In one embodiment, the polyfunctional monomer of the polymerization product contained in the alignment film has a plurality of vinyl groups.

In one embodiment, the polyfunctional monomer of the polymerization product contained in the alignment film is represented by general formula (1) Pb1-Ab1-(Zb1-Ab2)n-Pb2 (in general formula (1), Pb1 and Pb2 are, independently, acrylate, methacrylate, acrylamide, or methacrylamide; Ab1 and Ab2 represent, independently, 1,4-phenylene, 1,4-cyclohexane or 2,5-thiophene, or naphthalene-(2,6)-diyl or anthracene-(2,7)-diyl; and Z1 is a —COO— group, a —OCO— group, a —O— group, a —CONH— group or a single bond, where n is 0 or 1).

In one embodiment, at least one of Ab1 and Ab2 is substituted by at least one fluorine group.

In one embodiment, the polyfunctional monomer of the polymerization product contained in the alignment film includes a dimethacrylate monomer.

In one embodiment, the dimethacrylate monomer is represented by structural formula (1a).

[Formula 1]

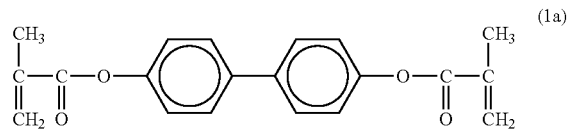

In one embodiment, the polyfunctional monomer of the polymerization product contained in the alignment sustaining layers has a plurality of vinyl groups.

In one embodiment, the polyfunctional monomer of the polymerization product contained in the alignment sustaining layers is represented by general formula (2) Pa1-Aa1-(Za1-Aa2)n-Pa2 (in general formula (2), Pa1 and Pa2 are, independently, acrylate, methacrylate, acrylamide, or methacrylamide; Aa1 and Aa2 represent, independently, 1,4-phenylene, 1, 4-cyclohexane or 2,5-thiophene, or naphthalene-(2,6)-diyl or anthracene-(2,7)-diyl; and Za1 is a —COO— group, a —OCO— group, a —O— group, a —CONH— group or a single bond, where n is 0 or 1).

In one embodiment, at least one of Aa1 and Aa2 is substituted by at least one fluorine group.

In one embodiment, the polyfunctional monomer of the polymerization product contained in the alignment sustaining layers includes a dimethacrylate monomer.

In one embodiment, the dimethacrylate monomer is represented by structural formula (2a).

[Formula 2]

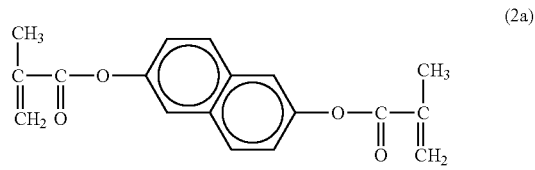

In one embodiment, the polyimide is a polyimide including a structure represented by general formula (3).

[Formula 3]

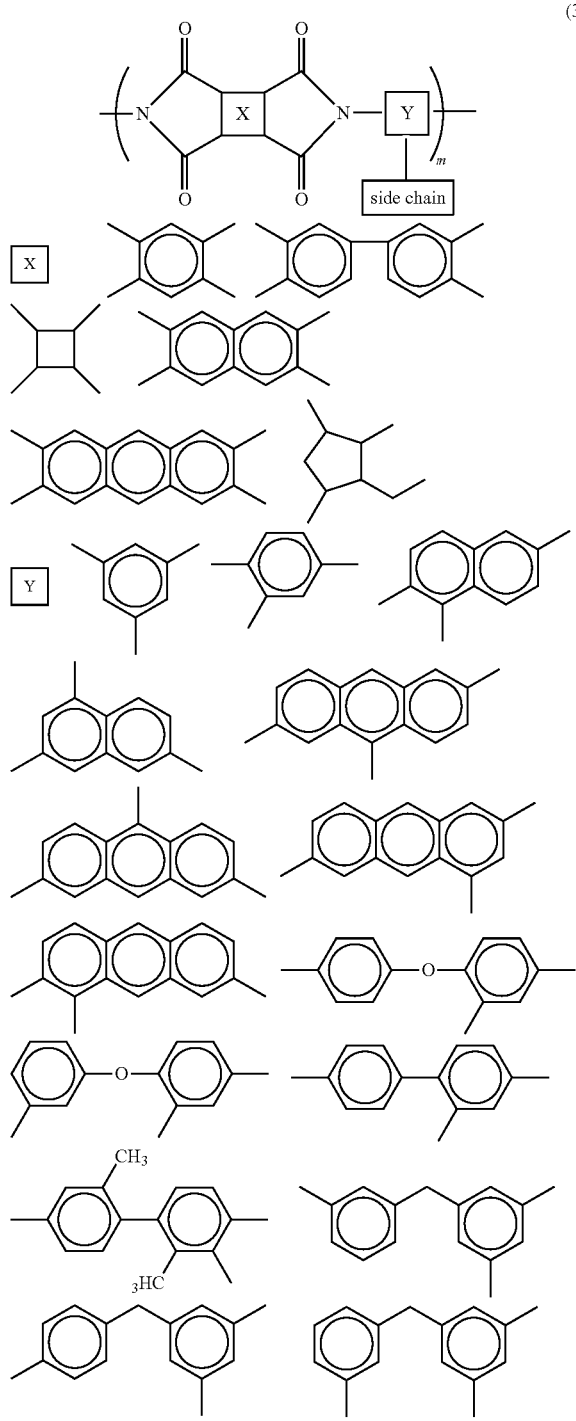

[Formula 4]

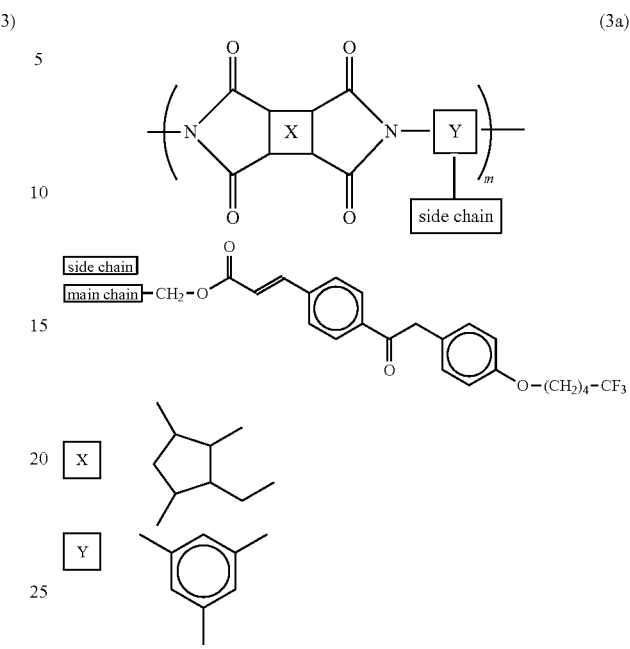

In one embodiment, the polyimide has a photoreactive functional group.

In one embodiment, the photoreactive functional group is one selected from the group consisting of a cinnamate group, a chalcone group, a tolan group, a coumarin group, and an azobenzene group.

In one embodiment, the polyimide is a polyimide including a structure represented by structural formula (3a).

In one embodiment, the polyimide has a vertical alignment group in a side chain thereof.

In one embodiment, the polyimide is represented by structural formula (3b).

[Formula 5]

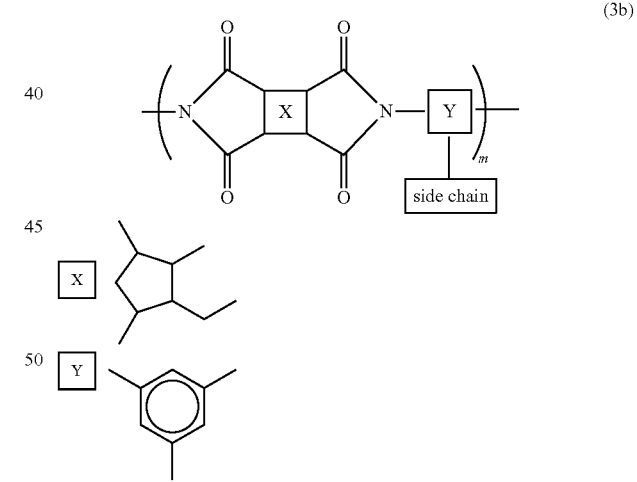

In one embodiment, the alignment film regulates liquid crystal molecules in the liquid crystal layer so that the liquid crystal molecules are inclined with respect to a normal direction of a principal face of the alignment film in the absence of an applied voltage.

In one embodiment, the liquid crystal display device has a plurality of pixels; and in each of the plurality of pixels, the liquid crystal layer has a plurality of liquid crystal domains having respectively different reference alignment azimuths.

In one embodiment, the plurality of liquid crystal domains are four liquid crystal domains.

A method of producing a liquid crystal display device according to the present invention is a method of producing a liquid crystal display device, the method comprising the steps of: forming an active matrix substrate and a counter substrate; and forming a liquid crystal layer between the active matrix substrate and the counter substrate, and forming alignment sustaining layers between the active matrix substrate and the liquid crystal layer and between the counter substrate and the liquid crystal layer, the alignment sustaining layers containing a polymerization product resulting from polymerization of a polyfunctional monomer, wherein the step of forming the active matrix substrate and the counter substrate comprises a step of providing a first insulative substrate having a pixel electrode provided thereon and a second insulative substrate having a counter electrode provided thereon, and a step of forming an alignment film on at least one of the pixel electrode and the counter electrode, the alignment film containing polyimide and a polymerization product resulting from polymerization of a polyfunctional monomer.

In one embodiment, the step of forming the alignment film comprises: a step of providing an alignment film material containing a precursor of the polyimide and the polyfunctional monomer; and a step of applying the alignment film material and performing a heat treatment, thereby imidizing the precursor of the polyimide to form the polyimide and forming a polymerization product resulting from polymerization of the polyfunctional monomer.

In one embodiment, the step of performing a heat treatment comprises a step of conducting a pre-bake and thereafter conducting a post-bake at a higher temperature than in the pre-bake.

In one embodiment, the step of forming the alignment sustaining layers comprises a step of performing light irradiation.

Advantageous Effects of Invention

According to the present invention, a liquid crystal display device whose image sticking is suppressed can be provided.

DESCRIPTION OF EMBODIMENTS

Hereinafter, with reference to the drawings, an embodiment of a liquid crystal display device according to the present invention and a method of producing the same will be described.

Figure 1:
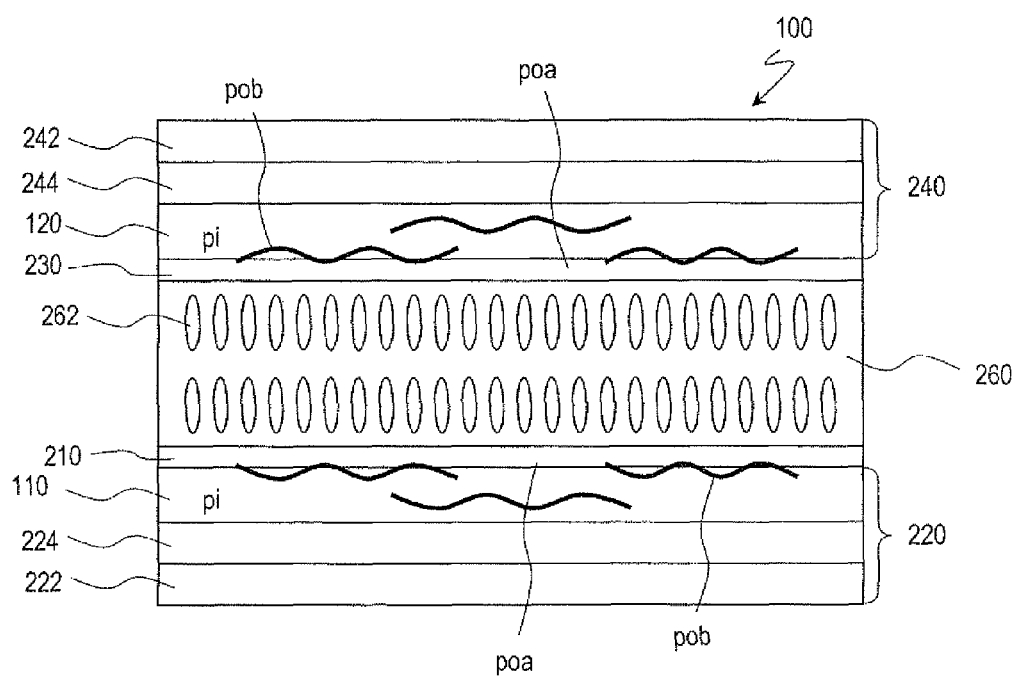
FIG. 1 A schematic diagram of an embodiment of a liquid crystal display device according to the present invention.

FIG. 1 shows a schematic diagram of a liquid crystal display device 100 of the present embodiment. The liquid crystal display device 100 includes an active matrix substrate 220 having a first alignment film 110, a counter substrate 240 having a second alignment film 120, and a liquid crystal layer 260 provided between the active matrix substrate 220 and the counter substrate 240. The liquid crystal display device 100 further includes a first alignment sustaining layer 210 located between the liquid crystal layer 260 and the active matrix substrate 220 and a second alignment sustaining layer 230 located between the liquid crystal layer 260 and the counter substrate 240.

The active matrix substrate 220 further includes a first insulative substrate 222 and pixel electrodes 224, such that the first alignment film 110 covers the pixel electrodes 224. Moreover, the counter substrate 240 further includes a second insulative substrate 242 and a counter electrode 244, such that the second alignment film 120 covers the counter electrode 244. For example, the first and second insulative substrates 222 and 242 are transparent glass substrates.

The liquid crystal display device 100 includes pixels composing a matrix of a plurality of rows and a plurality of columns. On the active matrix substrate 220, at least one switching element (e.g., thin film transistor (Thin Film Transistor: TFT))(not shown in the figure) is provided for each pixel, and the active matrix substrate 220 is also referred to a TFT substrate. In the present specification, a "pixel" refers to the smallest unit that expresses a specific gray scale level in displaying; in the case of multicolor displaying, a "pixel" corresponds to a unit that expresses a gray scale level of each of R, G, and B, for example, and is also referred to as a dot. A combination of an R pixel, a G pixel, and a B pixel composes a single color displaying pixel. A "pixel region" refers to a region of the liquid crystal device 100 that corresponds to a "pixel" in displaying.

Although not shown, a polarizer is provided on each of the active matrix substrate 220 and the counter substrate 240. Therefore, the two polarizers are disposed so as to oppose each other with the liquid crystal layer 260 interposed therebetween. The transmission axes (polarization axes) of the two polarizers are positioned so as to be orthogonal to each other, such that one of them extends along the horizontal direction (row direction), whereas the other extends along the vertical direction (column direction).

Although not shown in the figure, the liquid crystal display device 100 includes a liquid crystal panel, a driving circuit for driving the liquid crystal panel, and a control circuit for controlling the driving circuit. As necessary, the liquid crystal display device 100 may include a backlight.

The first alignment sustaining layer 210 is located between the first alignment film 110 and the liquid crystal layer 260. The second alignment sustaining layer 230 is located between the second alignment film 120 and the liquid crystal layer 260. Each of the first and second alignment sustaining layers 210 and 230 contains a polymerization product poa. The polymerization product poa is formed through polymerization of a precursor, which is a polyfunctional monomer. Specifically, after a liquid crystal material having the polyfunctional monomer mixed thereto is introduced between the active matrix substrate 220 and the counter substrate 240, the precursor is polymerized to form the polymerization product poa, and the polymerization product poa becomes phase-separated from the liquid crystal layer 260, whereby the first and second alignment sustaining layers 210 and 230 are formed.

The first alignment film 110 contains polyimide pi and a polymerization product pob. Similarly, the second alignment film 120 contains polyimide pi and the polymerization product pob. Polyimide pi is formed by imidizing a precursor thereof. The polymerization product pob is formed through polymerization of a polyfunctional monomer (precursor). The polymerization is performed by applying heat or light to the polyfunctional monomer.

The first alignment film 110 is formed from an alignment film material. The alignment film material is obtained by allowing the precursor of polyimide pi and the polyfunctional monomer to be dissolved in a solvent. For example, after applying the alignment film material, a heat treatment is performed to evaporate the solvent and effect imidization and polymerization, whereby the first alignment film 110 containing the polyimide pi and the polymerization product pob is formed. The heat treatment is performed twice at different temperatures, for example. Similarly, after applying the alignment film material, a heat treatment is performed to evaporate the solvent and effect imidization and polymerization, whereby the second alignment film 120 containing the polyimide pi and the polymerization product pob is formed.

As from the above, in the liquid crystal display device 100 of the present embodiment, the polymerization product poa within the first alignment sustaining layer 210 and the polymerization product pob within the first alignment film 110 are present in the neighborhood of the boundary between the active matrix substrate 220 and the liquid crystal layer 260. Similarly, the polymerization product poa within the second alignment sustaining layer 230 and the polymerization product pob within the second alignment film 120 are present in the neighborhood of the boundary between the counter substrate 240 and the liquid crystal layer 260. In the following description of the present specification, the polymerization product poa facing the liquid crystal layer 260 may be referred to as an upper polymerization product poa, whereas the polymerization product pob facing the insulative substrates 222 and 242 may be referred to as a lower polymerization product pob. Also, in the following description, a polyfunctional monomer that is the precursor of the upper polymerization product poa may be represented as a polyfunctional monomer ma, whereas a polyfunctional monomer that is the precursor of the lower polymerization product pob may be represented as a polyfunctional monomer mb.

The liquid crystal layer 260 contains a nematic liquid crystal material (liquid crystal molecules 262) having negative dielectric anisotropy. The first alignment film 110 and the second alignment film 120 are each treated so that the pretilt angle of the liquid crystal molecules 262 is less than 90° with respect to the surface of the vertical alignment film. The pretilt angle of the liquid crystal molecules 262 is an angle between principal faces of the first alignment film 110 and the second alignment film 120 and the major axis of each liquid crystal molecule 262 that is regulated in a pretilt direction.

Although the liquid crystal layer 260 is of a vertical-alignment type, due to the first alignment film 110 and the second alignment film 120, the liquid crystal molecules 262 in its neighborhood are slightly inclined from the normal directions of the principal faces of the first and second alignment films 110 and 120. The pretilt angle is within a range from 85° to 89.7°, for example. The pretilt angle is measured by crystal rotation technique, for example. The side chain of the polyimide pi regulates the pretilt direction of the liquid crystal molecules 262. In the following description, this component may also be referred to as a pretilt-angle-exhibiting component.

Note that the pretilt azimuth of the liquid crystal molecules 262 introduced by the first alignment film 110 is different from the pretilt azimuth of the liquid crystal molecules 262 introduced by the second alignment film 120. For example, the pretilt azimuth of the liquid crystal molecules 262 introduced by the first alignment film 110 intersects, at 90°, the pretilt azimuth of the liquid crystal molecules 262 introduced by the second alignment film 120. Herein, no chiral agent is added to the liquid crystal layer 260, and when a voltage is applied across the liquid crystal layer 260, the liquid crystal molecules 262 in the liquid crystal layer 260 take a twist alignment in accordance with the alignment regulating forces from the first and second alignment films 110 and 120. However, a chiral agent may be added to the liquid crystal layer 260 as necessary. In combination with polarizers which are placed in crossed Nicols, the liquid crystal layer 260 performs displaying in a normally black mode.

Moreover, each of the first and second alignment films 110 and 120 may have a plurality of alignment regions for each pixel. For example, a portion of the first alignment film 110 may be masked, and after a predetermined region of the first alignment film 110 is irradiated with light from a certain direction, another region which was not irradiated with light may be irradiated with light from a different direction. Furthermore, the second alignment film 120 is also formed similarly. In this manner, regions that confer different alignment regulating forces can be formed in each of the first and second alignment films 110 and 120.

The polyimide pi may include a photoreactive functional group in its main chain or side chain. The polyimide pi includes a structure represented by general formula (3), for example.

[Formula 6]

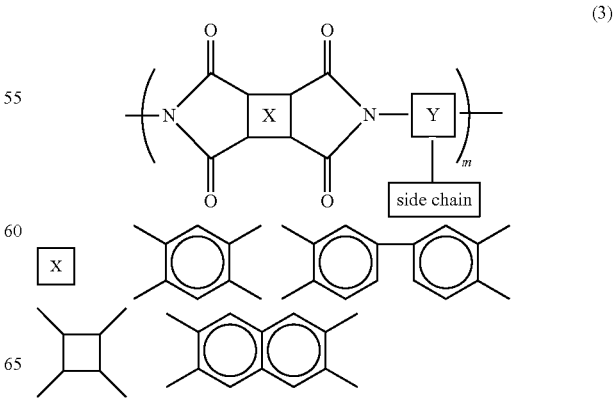

(3)

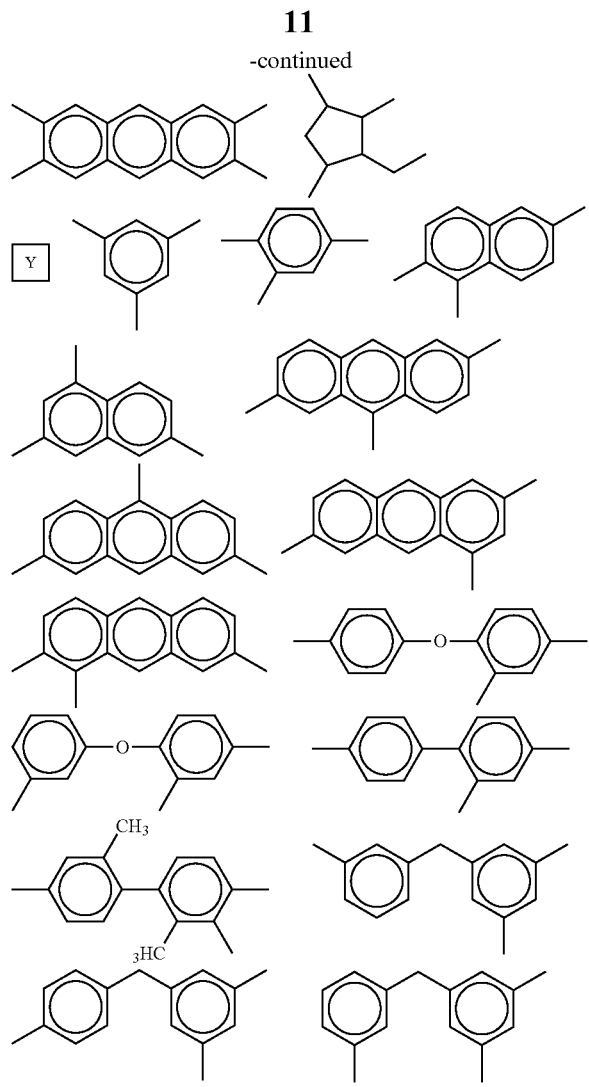

Moreover, the side chain of the polyimide pi may include a photoreactive functional group. In this case, a dimerization site is formed in the side chain through light irradiation. An alignment film containing such polyimide pi is also referred to as a photo-alignment film. The photoreactive functional group is a cinnamate group, a chalcone group, a tolan group, a coumarin group, or an azobenzene group, for example. In this case, by irradiating the first or second alignment film 110 or 120 with light from a direction which is oblique with respect to the normal direction of its principal face, an alignment regulating force is applied to the polyimide pi such that the liquid crystal molecules 262 are aligned so as to be inclined from the normal directions of the principal faces of the first and second alignment films 110 and 120 in the absence of an applied voltage. Such polyimide pi is also referred to as a photo-alignable polyimide, and such a treatment is also referred to as a photo-alignment treatment. Since a photo-alignment treatment is performed without involving any contact, static electricity will not occur due to friction as in a rubbing treatment, and thus the production yield can be improved. Moreover, the side chain of the polyimide pi may contain a fluorine atom. When the side chain contains a fluorine atom, the aforementioned image sticking is suppressed to a certain extent. For example, the polyimide pi includes a structure represented by structural formula (3a).

[Formula 7]

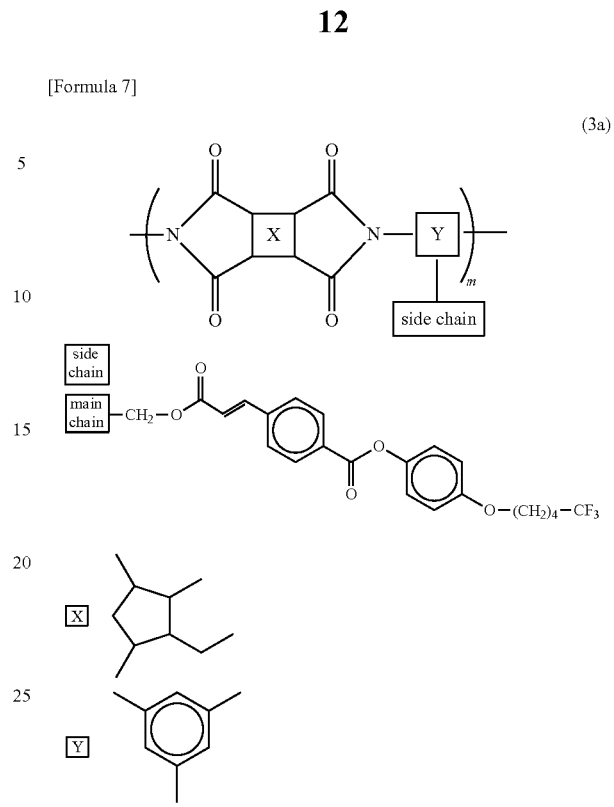

(3a)

Alternatively, the side chain of the polyimide pi may include a vertical alignment group. A polyimide having a vertical alignment group as a side chain is also referred to as a vertical-alignment type polyimide. After formation of the first and second alignment films 110 and 120, the first and second alignment films 110 and 120 may be subjected to a rubbing treatment or an ion beam irradiation, whereby a pretilt can be conferred to the liquid crystal molecules 262. For example, AL60101 manufactured by JSR Corporation is used as the precursor of the polyimide pi. In this case, the polyimide pi is represented by structural formula (3b).

[Formula 8]

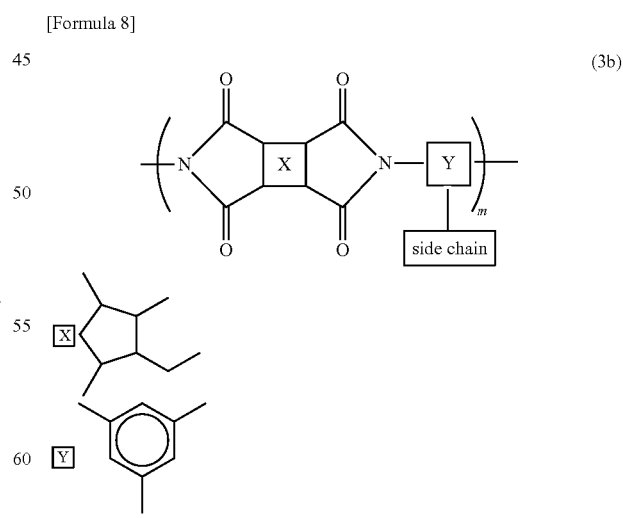

(3b)

Herein, the side chain of the polyimide is a saturated aliphatic or unsaturated aliphatic compound.

Moreover, a cross-linker may be mixed in the alignment film material. For example, the cross-linker is an epoxy-type cross-linker, e.g., a compound represented by structural formula (4). By using such a cross-linker, DC image sticking can be suppressed.

[Formula 9]

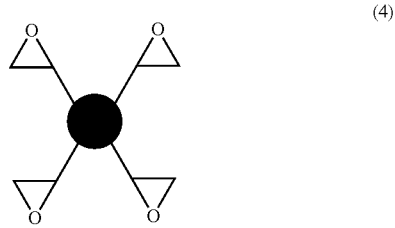

(4)

The polymerization product pob is obtained by polymerizing the polyfunctional monomer mb. For example, the polyfunctional monomer mb has a plurality of vinyl groups. For example, the polyfunctional monomer mb is represented by general formula (1) Pb1-Ab1-(Zb1-Ab2)n-Pb2. In general formula (1), Pb1 and Pb2 are, independently, acrylate, methacrylate, acrylamide, or methacrylamide; Ab1 and Ab2 represent, independently, 1,4-phenylene, 1,4-cyclohexane or 2,5-thiophene, or naphthalene-(2,6)-diyl or anthracene-(2,7)-diyl; and Zb1 is a —COO— group, a —OCO— group, a —O— group, a —CONH— group or a single bond, where n is 0 or 1. Specifically, the polyfunctional monomer mb is biphenyldimethacrylate. The polyfunctional monomer mb is represented by structural formula (1a), for example.

[Formula 10]

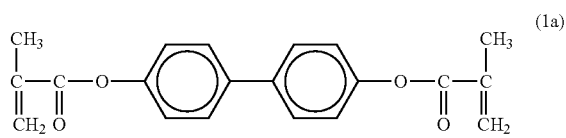

(1a)

As for the polyfunctional monomer mb, at least one of Ab1 and Ab2 may be substituted by at least one fluorine group in the aforementioned general formula (1); for example, a part of the biphenyl group in biphenyldimethacrylate may be substituted by a fluorine group. When the polyfunctional monomer mb has any fluorine groups, more polyfunctional monomer mb and more polymerization product thereof will be present on the surface of the first and second alignment films 110 and 120, thereby enhancing the effect of tilt angle stabilization. Moreover, it is preferable that the polyfunctional monomer mb has a symmetric structure; for example, it is preferable that an even number of hydrogen groups are substituted by fluorine groups.

The first and second alignment films 110 and 120 contain not only the polymerization product pob but also the polyimide pi, and thus, thermal resistance, solvent resistance, hygroscopicity, and other characteristics of the first and second alignment films 110 and 120 are substantially non-inferior to those of a commonly-used alignment film formed only of polyimide. Moreover, the first and second alignment films 110 and 120 contain the polymerization product pob, whereby the first and second alignment films 110 and 120 are structurally stabilized.

As described above, the alignment sustaining layers 210 and 230 contain the polymerization product poa. The polymerization product poa is obtained by polymerizing the polyfunctional monomer ma, and the polyfunctional monomer ma has a plurality of vinyl groups. For example, the polyfunctional monomer ma is represented by general formula (2) Pa1-Aa1-(Za1-Aa2)n-Pa2. In general formula (2), Pa1 and Pa2 are, independently, acrylate, methacrylate, acrylamide, or methacrylamide; Aa1 and Aa2 represent, independently, 1,4-phenylene, 1,4-cyclohexane or 2,5-thiophene, or naphthalene-(2,6)-diyl or anthracene-(2,7)-diyl; and Za1 is a —COO— group, a —OCO— group, a —O— group, a —CONH— group or a single bond, where n is 0 or 1.

Specifically, the polyfunctional monomer ma is represented by structural formula (2a).

[Formula 11]

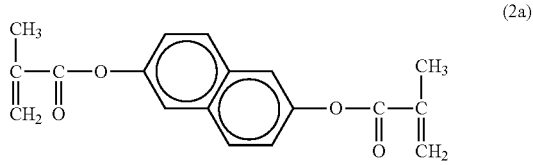

(2a)

Moreover, at least one of Aa1 and Aa2 may be substituted by at least one fluorine group. In the liquid crystal display device 100, the polyimide pi and the polymerization product pob are present in the first alignment film 110; however, in the first alignment sustaining layer 210, the polymerization product poa is present, but not the polyimide pi. Similarly, both of the polyimide pi and the polymerization product pob are present in the second alignment film 120; however, in the second alignment sustaining layer 230, the polymerization product poa is present, but not the polyimide pi.

In the liquid crystal display device 100 of the present embodiment, not only the upper polymerization product poa but also the lower polymerization product pob exists at the interface of the liquid crystal layer 260. Therefore, changes in the alignment function are sufficiently suppressed, and the pretilt angle of the liquid crystal molecules 262 in the liquid crystal layer 260 is maintained. When the monomer is a monofunctional monomer, the resultant polymerization product, i.e., a long linear polymer, is liable to deformation, and therefore changes in the alignment function cannot be sufficiently suppressed. On the other hand, when the monomer is a polyfunctional monomer, its polymerization product can sufficiently suppress changes in the alignment function.

The respective concentrations of the upper polymerization product poa and the lower polymerization product pob can be measured through a chemical analysis, such as nuclear magnetic resonance (NMR), Fourier transform infrared spectrometry (FT-IR), or mass spectrometry (MS). For example, the respective concentrations of the upper polymerization product poa and the lower polymerization product pob are measured by time of flight-secondary ion mass spectrometry (Time Of Flight-Secondary Ion Mass Spectrometry: TOP-SIMS). Alternatively, the concentrations of the upper polymerization product poa and the lower polymerization product pob are also measurable by X-ray photoelectron spectroscopy (X-ray Photoelectron Spectroscopy: XPS). In the case of XPS, for example, an apparatus manufactured by ULVAC-PHI, INCORPORATED may be used to analyze the atoms in the depth direction while etching with C60.

In the liquid crystal display device 100 of the present embodiment, as described above, the polymerization products poa and pob are present at the interface of the liquid crystal layer 260. As a result of this, the pretilt direction of the liquid crystal molecules 262 is fixed. This is presumably because the polymerization products poa and pob suppress deformation of the pretilt-angle-exhibiting component, thus allowing the alignment direction of the liquid crystal molecules 262 to be maintained.

Moreover, since the first and second alignment films 110 and 120 contain the polymerization product pob, impurities and the like which occurred due to damage during the alignment treatment are stabilized, whereby occurrence of impurity ions is suppressed. As a result of this, the residual DC voltage and voltage holding ratio are improved, as a result of which the occurrence of image sticking is suppressed.

Hereinafter, with reference to FIG. 2, a method of producing the liquid crystal display device 100 will be described.

Figure 2:
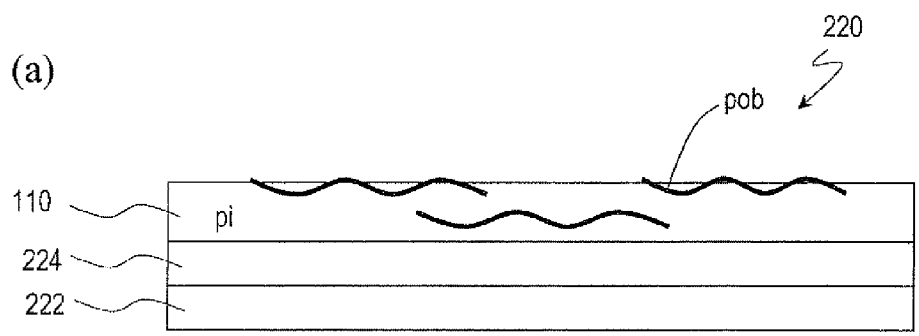
FIG. 2 (a) to (c) are schematic diagrams each illustrating a method of producing a liquid crystal display device of the present embodiment.
Figure 2:
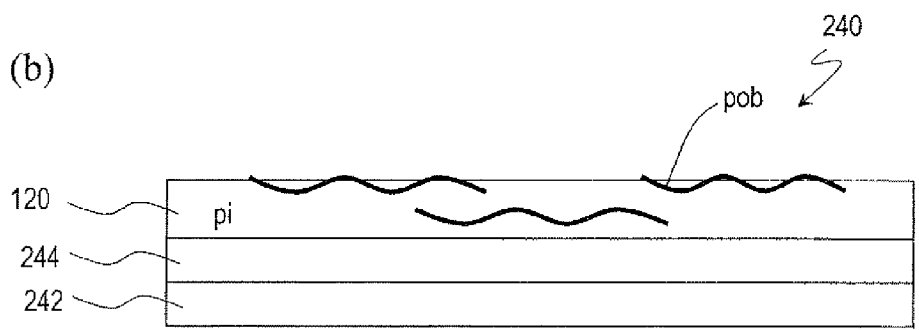
Figure 2:
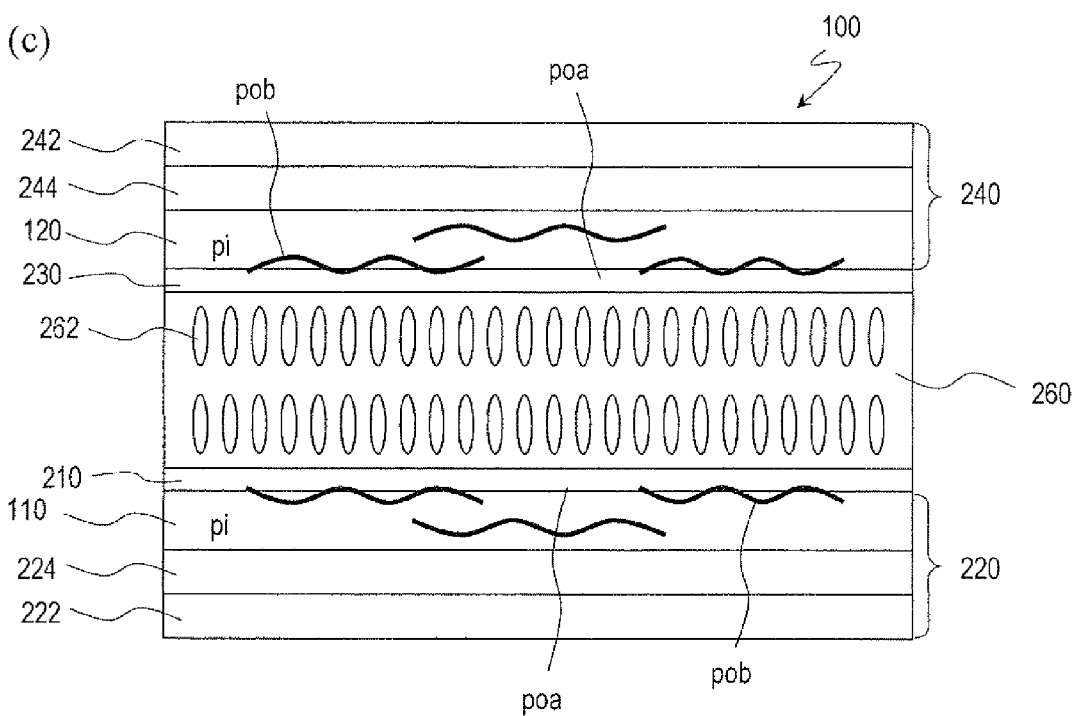

First, as shown in FIG. 2(*a*), the pixel electrodes 224 are formed on the first insulative substrate 222. Although not shown in FIG. 2(*a*), TFTs and wiring lines and the like that are connected thereto are provided between the first insulative substrate 222 and the pixel electrodes 224. Next, the first alignment film 110 covering the pixel electrodes 224 is formed.

Formation of the first alignment film 110 is performed as follows. First, the alignment film material is obtained (as a mixture) by allowing the precursor of the polyimide pi and the polyfunctional monomer mb to be dissolved in a solvent. For example, the precursor (polyamic acid) of the polyimide pi includes a structure represented by general formula (3').

[Formula 12]

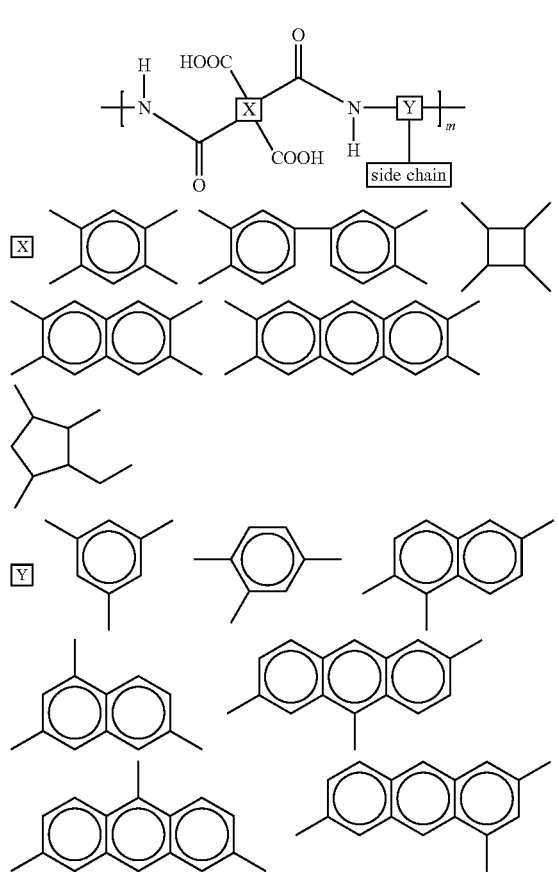

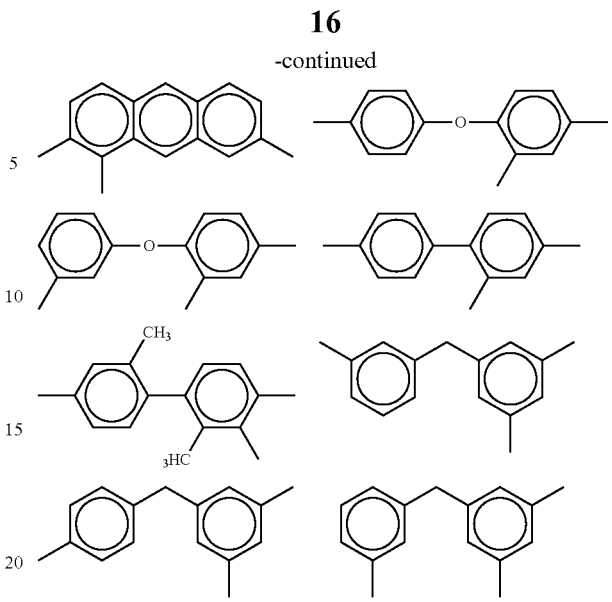

The precursor of the polyimide pi may have a cinnamate group as the photoreactive functional group. Moreover, this side chain may contain a fluorine atom. When the side chain contains a fluorine atom, the aforementioned image sticking is suppressed to a certain extent. Specifically, the precursor of the polyimide pi includes a structure represented by structural formula (3a').

[Formula 13]

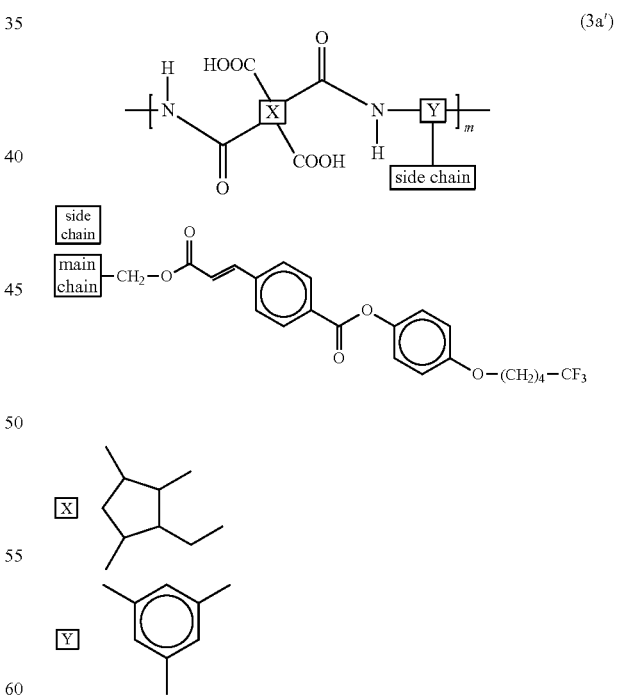

Alternatively, the precursor of the polyimide pi may have a vertical alignment group in its side chain, and AL60101 manufactured by JSR Corporation may be used. Specifically, the precursor of the polyimide pi is represented by structural formula (3b').

[Formula 14]

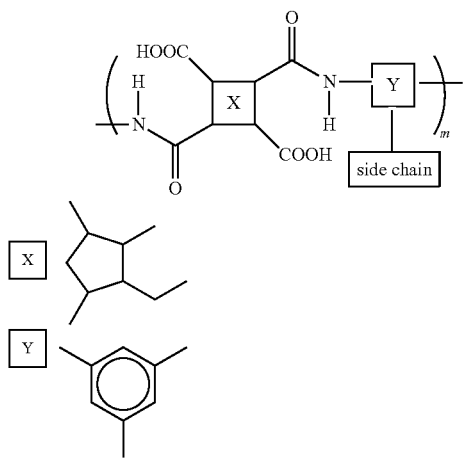

(3b')

Herein, the side chain is a saturated aliphatic or unsaturated aliphatic compound.

In the present embodiment, as described earlier, the alignment film material contains the polyfunctional monomer mb. The polyfunctional monomer mb may have two or more directly-bonded ring structures or one or more condensed ring structures, for example. For example, a methacrylate-type monomer or an acrylate-type monomer is used as the polyfunctional monomer mb. Specifically, the polyfunctional monomer mb is represented by structural formula (1a).

[Formula 15]

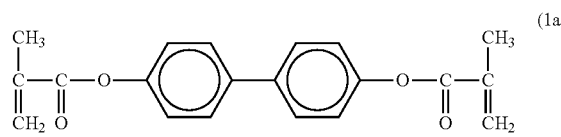

(1a)

Moreover, the solvent contains γ-butyrolactone and N-methylpyrrolidone (N-methylpyrrolidone: NMP), for example. The concentration of the polyfunctional monomer mb on the basis of the alignment film material is no less than 2 wt % and no more than 20 wt %, for example.

Next, the alignment film material is applied on the pixel electrodes 224. Application of the alignment film material is performed by a printing technique, an ink jet technique, or a spin coating technique.

Next, a heat treatment is conducted. As the heat treatment, for example, two heat treatments may be performed at different temperatures. Specifically, after performing a first heat treatment, a second heat treatment is performed at a higher temperature than that of the first heat treatment. The first heat treatment removes most of the solvent. In the following description, what remains after the solvent has been substantially removed will be referred to as an alignment film. Through the subsequent second heat treatment, imidization progresses, whereby the alignment film is stabilized. The first heat treatment is also referred to as a preliminary bake or a pre-bake, and the second heat treatment is also referred to as a full bake or a post-bake. Through the heat treatment, the polyamic acid is imidized, whereby the polyimide pi is formed. The polyimide pi includes a structure represented by general formula (3), for example.

[Formula 16]

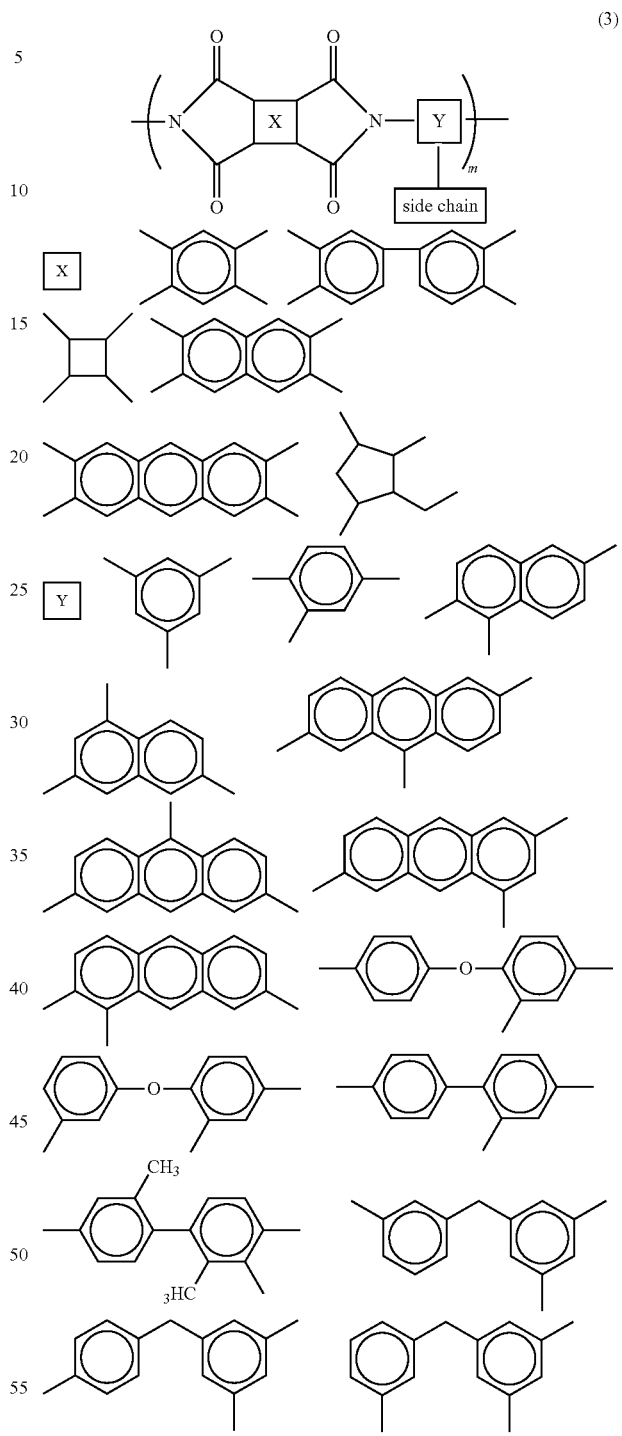

(3)

Note that the polyamic acid does not need to be completely imidized, and a portion thereof may still be polyamic acid. Moreover, through the heat treatment, the polyfunctional monomer mb is polymerized to form the polymerization product pob. The polyfunctional monomer mb polymerizes at a temperature which is equal to or less than that of the post-bake. The polymerization product pob exists also on the surface of the first alignment film 110. In this manner, the first alignment film 110 is formed.

Next, the first alignment film 110 is subjected to an alignment treatment. The alignment treatment may be performed after the first heat treatment (pre-bake), or after the second heat treatment (post-bake), in the formation of the first alignment film 110. For example, the alignment treatment is performed by irradiating the first alignment film 110 with light. For example, light of wavelengths in the range of no less than 250 nm and no more than 400 nm is radiated onto the first alignment film 110 at an irradiation dose of no less than 20 mJ/cm² and no more than 200 mJ/cm², from a direction which is inclined from the normal direction of the principal face of the first alignment film 110. If the irradiation dose increases from 200 mJ/cm², the alignment film may deteriorate so that the voltage holding ratio and the like may be lowered. Moreover, the irradiation angle of light may be in the range of no less than 5° and no more than 85°, and preferably no less than 40° and no more than 60°, from the normal direction of the principal face of the first alignment film 110. Note that, when the irradiation angle is small, it becomes difficult to confer a pretilt angle; when the irradiation angle is large, it takes more time to confer the same pretilt angle. Moreover, light may be unpolarized light, linearly polarized light, elliptically polarized light, or circularly polarized light. However, linearly polarized light is to be used in the case where a cinnamate group is used as the photoreactive functional group. Alternatively, as the alignment treatment, the first alignment film 110 may be subjected to a rubbing treatment or an ion beam irradiation.

As shown in FIG. 2(b), the counter electrode 244 is formed on the second insulative substrate 242. Next, the second alignment film 120 is formed on the counter electrode 244.

Formation of the second alignment film 120 is performed as follows. First, an alignment film material is provided. This alignment film material may be similar to that of the first alignment film 110. The alignment film material is applied, and a heat treatment is performed. The heat treatment removes most of the solvent. Through the subsequent second heat treatment, imidization progresses, whereby the alignment film is stabilized. The polyamic acid is imidized to form the polyimide pi. Moreover, through the heat treatment, the polyfunctional monomer mb is polymerized to form the polymerization product pob, such that the polymerization product pob exists also on the surface of the second alignment film 120. Thereafter, the second alignment film 120 is subjected to an alignment treatment. The alignment treatment is performed in a similar manner to the first alignment film 110.

Next, as shown in FIG. 2(c), the active matrix substrate 220 and the counter substrate 240 are attached together so that the first alignment film 110 and the second alignment film 120 oppose each other. In the present specification, the active matrix substrate and the counter substrate being attached together before formation of the liquid crystal layer may also be referred to as a "vacant panel".

Next, a liquid crystal material is provided. The polyfunctional monomer ma is mixed in the liquid crystal material. Specifically, the polyfunctional monomer ma is represented by structural formula (2a), for example.

[Formula 17]

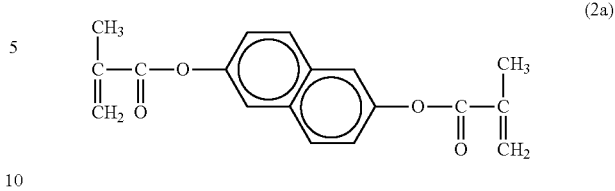

(2a)

The liquid crystal material is introduced between the first alignment film 110 and the second alignment film 120 of the vacant panel. As described above, the first and second alignment films 110 and 120 have been subjected to an alignment treatment, and thus the liquid crystal molecules 262 are aligned so as to be inclined from the normal directions of the principal faces of the first and second alignment films 110 and 120 even in the absence of an applied voltage. Moreover, the polymerization product pob has been formed, and even this alone can suppress image sticking caused by changes in the pretilt angle to a certain extent. In order to stabilize the alignment of the liquid crystal molecules 262, after injecting the liquid crystal material, the liquid crystal panel may be heated for a certain time and thereafter quenched.

Thereafter, the liquid crystal panel is irradiated with light. The light irradiation may be performed while applying a voltage between the pixel electrodes 224 and the counter electrode 244, or without applying a voltage. In the case where a voltage is applied when performing light irradiation, a large change in the pretilt angle of the liquid crystal molecules 262 can be attained.

In the light irradiation, a black light or fluorescent lamp is used as a light source, for example. Through the light irradiation, the polyfunctional monomer ma mixed in the liquid crystal material is polymerized to form the polymerization product poa. The polymerization product poa becomes phase-separated from the liquid crystal layer 260, whereby the first and second alignment sustaining layers 210 and 230 containing the polymerization product poa are formed.

If any unreacted monomer remains in the liquid crystal material, the voltage holding ratio (Voltage Holding Ratio: VHR) will be lowered. Therefore, in order to reduce the residual monomer, ultraviolet light may be radiated for a long time. For example, black light irradiation is continued until the peak that is attributable to the polyfunctional monomer ma is no longer observable by gas chromatography.

In this manner, a liquid crystal panel is formed. Thereafter, a driving circuit and a control circuit not shown are mounted on the liquid crystal panel, whereby the liquid crystal display device 100 is fabricated.

As the polyfunctional monomer mb in the alignment film material increases, the exposed amount of carboxylic acid in the polyamic acid at the surface of the first and second alignment films 110 and 120 decreases, and the concentration of the lower polymerization product pob increases. Since such a lower polymerization product pob undergoes a radical reaction with the polyfunctional monomer ma in the liquid crystal material as well as the upper polymerization product poa before phase separation, the polyfunctional monomer ma and the low-molecular weight upper polymerization product poa existing in the liquid crystal material will rapidly decrease, and the phase separation of the first and second alignment sustaining layers 210 and 230 containing the upper polymerization product poa from the liquid crystal layer 260 will be promoted.

In the liquid crystal display device 100 of the present embodiment, the residual DC voltage and voltage holding ratio are improved because the first and second alignment films 110 and 120 contain the polymerization product pob. The reason thereof will be described below.

Figure 3:
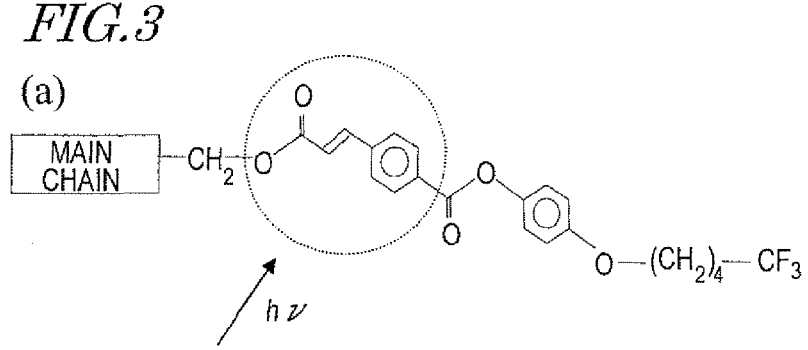
FIG. 3 (a) is a schematic diagram showing a side chain of polyimide; (b) is a schematic diagram showing emergence of an ionized site; (c) is a schematic diagram showing the ionized site dissolving into a liquid crystal layer; and (d) is a schematic diagram showing how dissolution of the ionized site into the liquid crystal layer is suppressed in the liquid crystal display device of the present embodiment.
Figure 3:
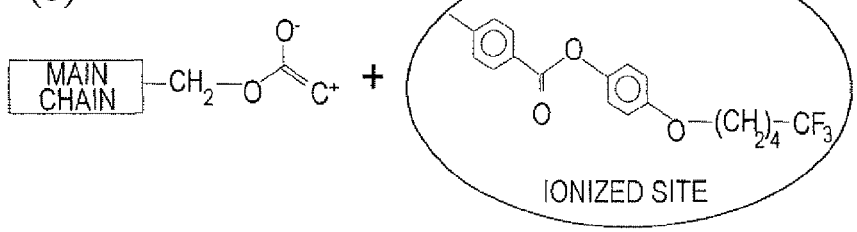
Figure 3:
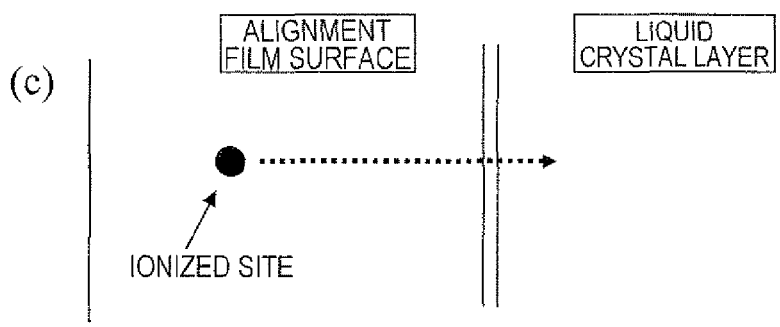
Figure 3:
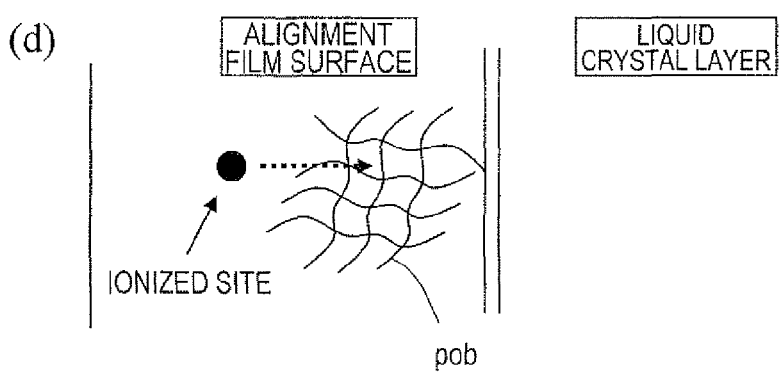

In the case where the first and second alignment films of the liquid crystal display device do not contain the polymerization product, if light is radiated for polymerization of the polyfunctional monomer ma, a portion of the alignment film may dissolve into the liquid crystal layer, thus deteriorating the residual DC voltage and voltage holding ratio. For example, if the side chain of the polyimide pi represented by structural formula (3a) is irradiated with light as shown in FIG. 3(a), a portion thereof is separated to become an ionized site as shown in FIG. 3(b), and dissolves into the liquid crystal layer as shown in FIG. 3(c). On the other hand, in the liquid crystal display device 100 of the present embodiment, as shown in FIG. 3(d), the dissolution of the ionized site into the liquid crystal layer 260 is suppressed because the polymerization product pob exists in the first and second alignment films 110 and 120.

Figure 4:
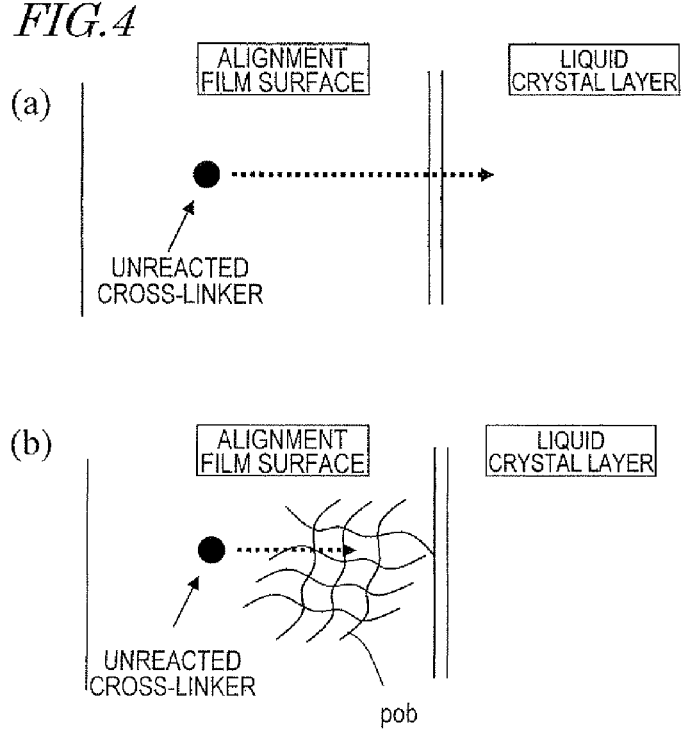
FIG. 4 (a) is a schematic diagram showing dissolution of unreacted cross-linker into a liquid crystal layer; and (b) is a schematic diagram showing how the dissolution of unreacted cross-linker into the liquid crystal layer is suppressed in the liquid crystal display device of the present embodiment.

In the case where the alignment film material contains a cross-linker, if light is radiated for polymerization of the polyfunctional monomer ma, as shown in FIG. 4(a), the unreacted cross-linker will dissolve into the liquid crystal layer. On the other hand, in the liquid crystal display device 100 of the present embodiment, as shown in FIG. 4(b), the dissolution of the cross-linker into the liquid crystal layer 260 is suppressed because the polymerization product pob exists in the first and second alignment films 110 and 120.

In the aforementioned PSA technique, a polymerization product is formed under an applied voltage. In the case where ultraviolet light for the purpose of polymerization product formation is radiated while thus applying a voltage, a complex fabrication apparatus is required in which a device for applying a voltage across the liquid crystal panel and a device for radiating ultraviolet light are integrated. Moreover, since ultraviolet light irradiation is performed after a voltage is applied across the liquid crystal panel for a long time for obtaining a predetermined alignment, this fabrication apparatus needs to be used for a long time. Moreover, when forming the liquid crystal layer of a liquid crystal panel through dropwise application of a liquid crystal material, generally speaking, a plurality of liquid crystal panels are simultaneously produced by using a large-sized mother glass substrate, and thereafter each liquid crystal panel is cut out from the large-sized mother glass substrate. In this case of simultaneously producing a plurality of liquid crystal panels, a design must be adopted such that special wiring lines are formed on the mother glass substrate for allowing a voltage to be simultaneously applied to the plurality of liquid crystal panels.

Moreover, in the case where a liquid crystal panel of a particularly large size is to be produced, it is difficult to uniformly apply a voltage across the liquid crystal layer in the respective pixels. If ultraviolet light irradiation is performed with non-uniform voltages being applied, there will be fluctuations in the pretilt angle. Moreover, in the case of applying a voltage during polymerization product formation, ribs, slits, or rivets need to be provided on the pixel electrode and the counter electrode for improved viewing angle characteristics. This will result in an increased number of steps and a decrease in the effective aperture ratio.

On the other hand, according to the production method of the present embodiment, it is not necessary to apply a voltage when forming the polymerization products poa and pob. Therefore, the liquid crystal display device 100 can be easily produced without using a complex fabrication apparatus. Moreover, a liquid crystal panel can be easily produced even when producing the liquid crystal layer 260 through dropwise application of a liquid crystal material. Moreover, since it is not necessary to apply a voltage across the liquid crystal layer 260 of all pixels when forming the polymerization products poa and pob, fluctuations in the pretilt angle among liquid crystal molecules 262 can be suppressed. Furthermore, the transmittance, contrast ratio, and viewing angle can be improved without providing ribs, slits, or rivets on the pixel electrodes 224 and the counter electrode 244.

Note that slits, ribs, and/or rivets may be provided on the pixel electrodes 224 and the counter electrode 244. Alternatively, slits, ribs, and/or rivets may not be provided on the pixel electrodes 224 and the counter electrode 244, and the liquid crystal molecules 262 may be aligned in accordance with an oblique electric field which is created by a highly-symmetrical pixel electrode 226 and the counter electrode 246. As a result, the alignment regulating force of the liquid crystal molecules 262 under an applied voltage can be further increased.

Moreover, in order to increase the tilt of the liquid crystal molecules 262 from the normal directions of the principal faces of the first and second alignment films 110 and 120 in the absence of an applied voltage, a voltage may be applied between the pixel electrodes 224 and the counter electrode 244 during the light irradiation for forming the first and second alignment sustaining layers 210 and 230.

Although the above description illustrates that the first and second alignment films 110 and 120 are made of the same alignment film material, and the characteristics of the second alignment film 120 are similar to those of the first alignment film 110, the present invention is not limited thereto. The characteristics of the second alignment film 120 may be different from those of the first alignment film 110, and the first and second alignment films 110 and 120 may be made of different alignment film materials. For example, at least one of the polyimide pi and the polymerization product pob of the first alignment film 110 may be different from at least one of the polyimide pi and the polymerization product pob of the second alignment film 120.

Although the above description illustrates that the first and second alignment films 110 and 120 each contain the polymerization product pob, the present invention is not limited thereto. Only one of the first and second alignment films 110 and 120 may contain the polymerization product pob. However, if the second alignment film 120 differs in characteristics from the first alignment film 110, the impurities remaining in the first and second alignment films 110 and 120 will tend to be asymmetric. Therefore, it is preferable that the characteristics of the second alignment film 120 are similar to those of the first alignment film 110.

Although the above description illustrates that the active matrix substrate 220 and the counter substrate 240 respectively include the first and second alignment films 110 and 120, the present invention is not limited thereto. Only one of the active matrix substrate 220 and the counter substrate 240 may include the first or second alignment film 110 or 120.

Although the above description illustrates that polymerization product pob is formed through a heat treatment, the present invention is not limited thereto. The polymerization product pob may be formed through light irradiation. For example, in such light irradiation, a light source which mainly emits ultraviolet light (i-line) with a wavelength of 365 nm is suitably used. The irradiation time is about 500 seconds, for example, and the irradiation intensity of light is about 20 mW/cm$^2$. In the case where polymerization is effected through light irradiation, the polyfunctional monomer mb will sufficiently polymerize even if the irradiation intensity of light is 10 mW/cm² or less. The wavelength of light is preferably in the range of no less than 250 nm and no more than 400 nm, and more preferably in the range of no less than 300 nm and no more than 400 nm. However, polymerization will sufficiently occur with light of a wavelength greater than 400 nm. Although polymerization can occur with light of a wavelength of 300 nm or less, the irradiation dose should preferably be as small as possible because decomposition of organic matter will occur with irradiation of deep-ultraviolet with wavelengths near 200 nm.

Moreover, the liquid crystal display device 100 may be of the 4D-RTN (4 Domain-Reverse Twisted Nematic) mode in which four-split alignment is realized. Hereinafter, a liquid crystal display device of the 4D-RTN mode will be described with reference to FIG. 5 and FIG. 6.

Figure 5:
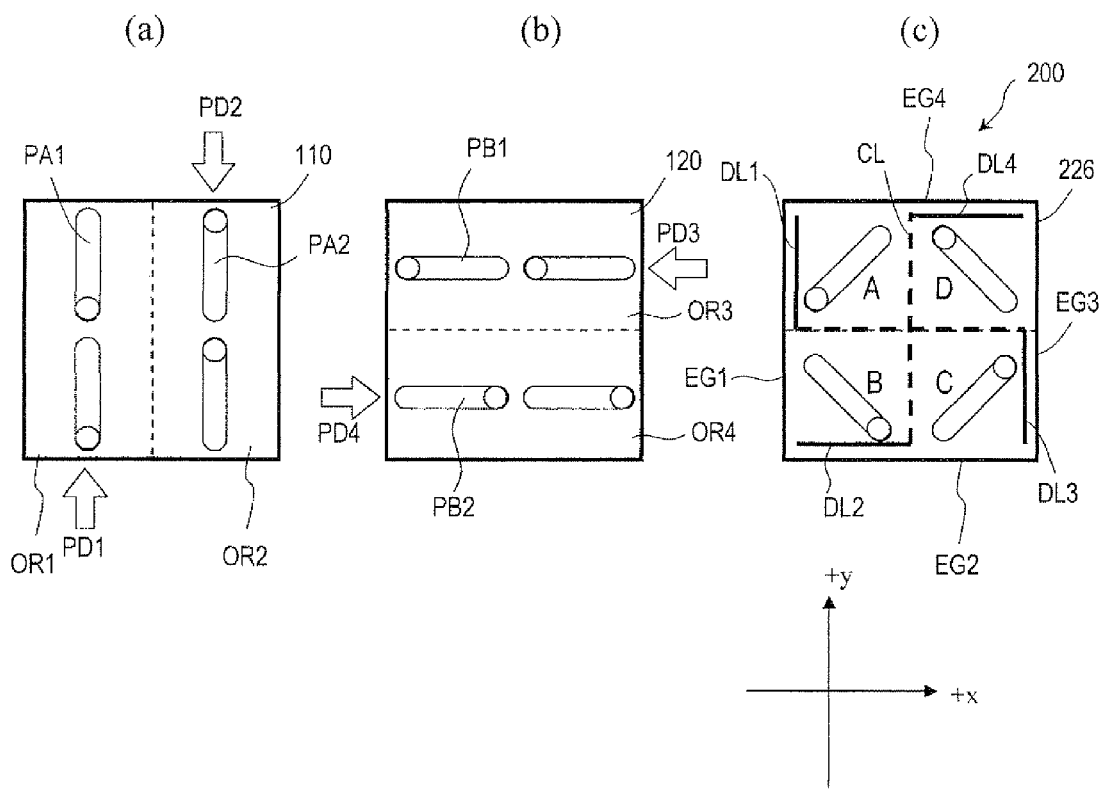
FIG. 5 (a) is a schematic diagram of an alignment film of the liquid crystal display device of the present embodiment; (b) is a schematic diagram of the alignment film; and (c) is a schematic diagram showing alignment directions of liquid crystal molecules in the centers of liquid crystal domains.

FIG. 5(*a*) shows pretilt directions PA1 and PA2 of liquid crystal molecules as regulated on the first alignment film 110 of the active matrix substrate 220, and FIG. 5(*b*) shows pretilt directions PB1 and PB2 of liquid crystal molecules as regulated on the second alignment film 120 of the counter substrate 240. FIG. 5(*c*) shows alignment directions of liquid crystal molecules in the centers of liquid crystal domains A to D under an applied voltage, and regions (domain lines) DL1 to DL4 appearing dark due to alignment disorder. Note that the domain lines DL1 to DL4 are not so-called disclination lines.

FIG. 5(*a*) to FIG. 5(*c*) schematically show alignment directions of liquid crystal molecules as seen from the viewer side. FIG. 5(*a*) to FIG. 5(*c*) indicate that the end portions (essentially circular portions) of the cylindrical liquid crystal molecules are tilted toward the viewer.

As shown in FIG. 5(*a*), the first alignment film 110 includes a first alignment region OR1 and a second alignment region OR2. The liquid crystal molecules regulated by the first alignment region OR1 are tilted in the −y direction from the normal direction of the principal face of the first alignment film 110, whereas the liquid crystal molecules regulated by the second alignment region OR2 of the first alignment film 110 are tilted in the +y direction from the normal direction of the principal face of the first alignment film 110. Moreover, the boundary between the first alignment region OR1 and the second alignment region OR2 extends in the column direction (y direction), and located in the substantial center along the row direction (x direction) of pixels. Thus, first and second alignment regions OR1 and OR2 of different pretilt azimuths are provided on the first alignment film 110.

Moreover, as shown in FIG. 5(*b*), the second alignment film 120 includes a third alignment region OR3 and a fourth alignment region OR4. The liquid crystal molecules regulated by the third alignment region OR3 are tilted in the +x direction from the normal direction of the principal face of the second alignment film 120, such that the −x direction end portions of these liquid crystal molecules are pointed toward the front face. The liquid crystal molecules regulated by the fourth alignment region OR4 of the second alignment film 120 are tilted in the −x direction from the normal direction of the principal face of the second alignment film 120, such that the +x direction end portions of these liquid crystal molecules are pointed toward the front face. Thus, the second alignment film 120 includes third and fourth alignment regions OR3 and OR4 with different pretilt azimuths.

An alignment treatment direction corresponds to an azimuth angle component obtained by projecting a direction, which extends toward an alignment region along the major axes of the liquid crystal molecules, onto that alignment region. The alignment treatment directions of the first, second, third, and fourth alignment regions are also referred to as first, second, third, and fourth alignment treatment directions.

The first alignment region OR1 of the first alignment film 110 has been subjected to an alignment treatment along a first alignment treatment direction PD1, whereas the second alignment region OR2 has been subjected to an alignment treatment along a second alignment treatment direction PD2 which is different from the first alignment treatment direction PD1. The first alignment treatment direction PD1 is essentially antiparallel to the second alignment treatment direction PD2. Moreover, the third alignment region OR3 of the second alignment film 120 has been subjected to an alignment treatment along a third alignment treatment direction PD3, whereas the fourth alignment region OR4 has been subjected to an alignment treatment along a fourth alignment treatment direction PD4 which is different from the third alignment treatment direction PD3. The third alignment treatment direction PD3 is essentially antiparallel to the fourth alignment treatment direction PD4.

As shown in FIG. 5(*c*), four liquid crystal domains A, B, C, and D are formed in the liquid crystal layer of a pixel. In the liquid crystal layer 260, a portion interposed between the first alignment region OR1 of the first alignment film 110 and the third alignment region OR3 of the second alignment film 120 defines the liquid crystal domain A; a portion interposed between the first alignment region OR1 of the first alignment film 110 and the fourth alignment region OR4 of the second alignment film 120 defines a liquid crystal domain B; a portion interposed between the second alignment region OR2 of the first alignment film 110 and the fourth alignment region OR4 of the second alignment film 120 defines a liquid crystal domain C; and a portion interposed between the second alignment region OR2 of the first alignment film 110 and the third alignment region OR3 of the second alignment film 120 defines a liquid crystal domain D. Note that the angle constituted by the first or second alignment treatment direction PD1 or PD2 and the third or fourth alignment treatment direction PD3 or PD4 is essentially 90°, and the twist angle in each of the liquid crystal domains A, B, C, and D is essentially 90°.

Figure 6:
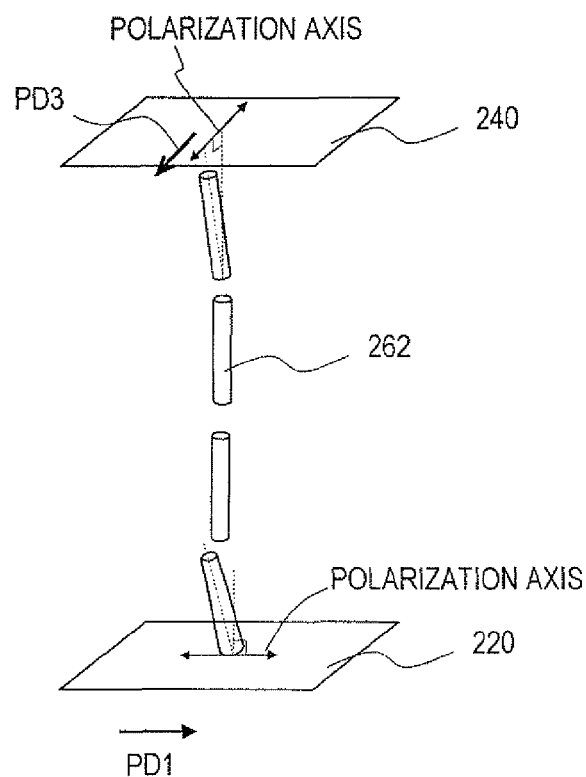
FIG. 6 A schematic diagram showing alignment directions of liquid crystal molecules in one liquid crystal domain of the liquid crystal display device of the present embodiment.

FIG. 6 shows the alignment directions of the liquid crystal molecules 262 in the liquid crystal domain A. The angle between the alignment treatment direction PD1 of the first alignment film 110 and the alignment treatment direction PD3 of the second alignment film 120 is 90°, and the liquid crystal molecules 262 have a twist angle of 90°. Although not shown in the figure, the liquid crystal molecules 262 in the other liquid crystal domains B, C, and D are also similarly twisted.

FIG. 5(*c*) is referred to again. The alignment direction of a liquid crystal molecule at the center of a liquid crystal domain A to D is an intermediate direction between the pretilt direction for liquid crystal molecules introduced by the first alignment film 110 and the pretilt direction for liquid crystal molecules introduced by the second alignment film 120. In the present specification, the alignment direction of a liquid crystal molecule in the center of a liquid crystal domain is referred to as a reference alignment direction; and within the reference alignment direction, an azimuth angle component in a direction from the rear face toward the front face and along the major axis of the liquid crystal molecule (i.e., an azimuth angle component obtained by projecting the reference alignment direction onto the principal face of the first alignment film 110 or the second alignment film 120) is referred to as a reference alignment azimuth. The reference alignment azimuth characterizes its corresponding liquid crystal domain, and exerts a predominant influence on the viewing angle characteristics of that liquid crystal domain. Now, by relying on the horizontal direction (right-left direction) of the display screen (plane of the figure) as a reference for the azimuthal direction, and defining the left turn as positive (i.e., if the display surface is compared to the face of a clock, counter-clockwise is positive, the 3 o'clock direction being an azimuth angle of 0°), the reference alignment directions of the four liquid crystal domains A to D are set to be four directions such that the difference between any two directions is substantially equal to an integer multiple of 90°. Specifically, the reference alignment azimuths of the liquid crystal domains A, B, C, and D are, respectively, 225°, 315°, 45°, and 135°.

As shown in FIG. 5(c), the domain lines DL1 to DL4 are respectively formed in the liquid crystal domains A, B, C, and D. The domain line DL1 is formed in parallel to a portion of an edge EG1 of the pixel electrode 224, whereas the domain line DL2 is formed in parallel to a portion of an edge EG2. Moreover, the domain line DL3 is formed in parallel to a portion of an edge EG3 of the pixel electrode 224, whereas the domain line DL4 is formed in parallel to a portion of an edge EG4. Moreover, a disclination line CL indicated by a broken line is observed in a border region where each of the liquid crystal domains A to D adjoins another liquid crystal domain. The disclination lines CL are dark lines in the aforementioned central portion. The disclination lines CL and the domain lines DL1 to DL4 are continuous, thus resulting in dark lines of a reverse 卍 shape. Although the dark lines herein are in a reverse 卍 shape, the dark lines may be in an 8 shape.

Figure 7:
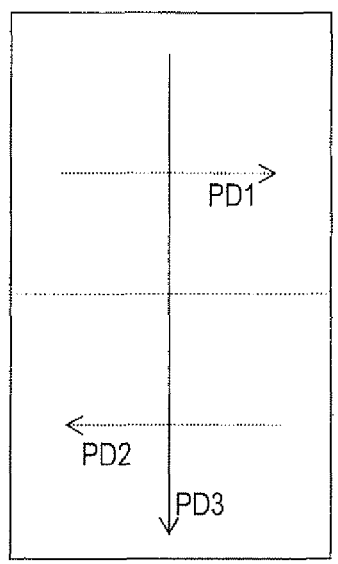
FIG. 7 A schematic diagram showing alignment treatment directions for first and second alignment films as viewed from the viewer's side.

Although the above-described liquid crystal display device realizes four-split alignment, the present invention is not limited thereto. Two-split alignment may be realized in the liquid crystal display device 100. FIG. 7 shows alignment treatment directions for the first and second alignment films 110 and 120. As described above, the active matrix substrate 220 and the counter substrate 240 are attached together so that the angles between the alignment treatment directions PD1 and PD2 of the first alignment film 110 and the alignment treatment direction PD3 of the second alignment film 120 are 90°, and the liquid crystal molecules 262 have a twist angle of 90°.

Figure 8:
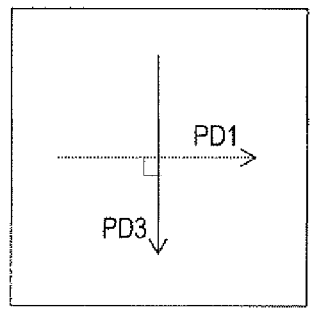
FIG. 8 A schematic diagram showing alignment treatment directions for the first and second alignment films as viewed from the viewer's side.

Alternatively, the liquid crystal display device 100 does not need to be split in terms of alignment. FIG. 8 shows alignment treatment directions for the first and second alignment films 110 and 120. As described above, the active matrix substrate 220 and the counter substrate 240 are attached together so that the angle between the alignment treatment direction PD1 of the first alignment film 110 and the alignment treatment direction PD3 of the second alignment film 120 is 90°, and the liquid crystal molecules 262 have a twist angle of 90°.

Although the above-described liquid crystal display device is of the RTN mode, the present invention is not limited thereto. The liquid crystal display device may be of the CPA mode.

Hereinafter, liquid crystal display devices of the present Examples will be described.

Example 1

Hereinafter, with reference to FIG. 1, FIG. 6, and FIG. 8, a liquid crystal display device of Example 1 will be described. The liquid crystal display device of Example 1 also operates in the RTN mode.

First, on a principal face of the first insulative substrate 222, although not shown in the figures, TFTs and wiring lines connected to the TFTs, and an insulating layer and the like were formed, upon which the pixel electrodes 224 were formed. Similarly, on a principal face of the second insulative substrate 242, although not shown in the figures, a colored layer having color filters, and an insulating layer and the like were formed, upon which the counter electrode 244 was formed.

Next, an alignment film material was prepared. The alignment film material was obtained by allowing the precursor (polyamic acid) of the polyimide pi represented by structural formula (3a') to be dissolved in a solvent, and thereafter allowing the polyfunctional monomer mb to be further dissolved therein. The precursor of the polyimide pi had a cinnamate group in its side chain. The polyfunctional monomer mb was biphenyldimethacrylate as represented by structural formula (1a). The concentration of the polyfunctional monomer mb on the basis of the alignment film material was 10 wt %.

First, the alignment film material was applied on the pixel electrodes 224. The application of the alignment film material was performed by a printing technique, an ink jet technique, or a spin coating technique. As a first heat treatment (pre-bake), one minute of heating was conducted at 90° C. to remove the solvent to a certain extent; and furthermore, 40 minutes of heating was conducted at 200° C. as a second heat treatment (post-bake). Through such heat treatments, the first alignment film 110 containing the polyimide pi, into which the polyamic acid had imidized, and the polymerization product pob, into which the polyfunctional monomer mb had polymerized, was formed. The fraction of imide units of the polyimide pi was about 50%. Thereafter, obliquely from a 40° direction with respect to the normal direction of a principal face of the first alignment film 110, P-polarized light with a peak wavelength of 330 nm was radiated at 50 mJ/cm$^2$, thus performing a photo-alignment treatment. Similarly, the aforementioned alignment film material was applied to form the second alignment film 120 on the counter electrode 244, and a photo-alignment treatment was performed.

Next, the active matrix substrate 220 and the counter substrate 240 were attached together so that the first alignment film 110 and the second alignment film 120 opposed each other and that the angle between the alignment treatment direction of the first alignment film 110 and the alignment treatment direction of the second alignment film was 90°, and fixed so that the interspace between the active matrix substrate 220 and the counter substrate 240 was about 4 μm. Specifically, after applying a seal onto the active matrix substrate 220 and scattering beads over the counter substrate 240, the active matrix substrate 220 and the counter substrate 240 were attached together.

Next, the polyfunctional monomer ma represented by structural formula (2a) was mixed in a nematic liquid crystal material having negative dielectric anisotropy. The concentration of the polyfunctional monomer ma on the basis of the liquid crystal material was 0.6 wt %. Then, the liquid crystal material was injected between the active matrix substrate 220 and the counter substrate 240, and a heating-quenching was performed at 130° C.

Next, black light irradiation was performed to form a polymerization product of the polyfunctional monomer ma. If any polyfunctional monomer ma remains in the liquid crystal material, the voltage holding ratio and residual DC voltage will be deteriorated. Therefore, the black light irradiation was continued until the peak attributable to the polyfunctional monomer ma was no longer observable by gas chromatography.

FIG. 6 shows an alignment state of the liquid crystal molecules 262 in the liquid crystal display device of Example 1. As shown in FIG. 8, the angle between the active matrix substrate 220 and the counter substrate 240 were attached together so that the alignment treatment direction PD1 of the first alignment film 110 and the alignment treatment direction PD3 of the second alignment film 120 was 90°, and the liquid crystal molecules 262 had a twist angle of 90°. Herein, the polarization axis of the polarizer on the active matrix substrate 220 was parallel to the alignment treatment direction PD1 of the first alignment film 110, and the polarization axis of the polarizer on the counter substrate 240 was parallel to the alignment treatment direction PD3 of the second alignment film 120. In this manner, the liquid crystal panel of Example 1 was produced.

Moreover, three liquid crystal panels were produced for the sake of comparison. In producing a liquid crystal panel of Comparative Example 1-1, the polyfunctional monomer ma was not mixed in the liquid crystal material, and the polyfunctional monomer mb was not mixed in the alignment film material. As a result, the liquid crystal panel of Comparative Example 1-1 did not have any alignment sustaining layers, and its alignment films did not contain the polymerization product. In the liquid crystal panel of Comparative Example 1-1, since the monomer within the liquid crystal material was not subjected to polymerization, black light irradiation was not performed.

In producing a liquid crystal panel of Comparative Example 1-2, the polyfunctional monomer ma represented by structural formula (2a) was mixed in the liquid crystal material and a photopolymerization was carried out, but the polyfunctional monomer mb was not mixed in the alignment film material. As a result, the alignment films of the liquid crystal panel of Comparative Example 1-2 did not contain the polymerization product. Since polymerization of the monomer within the liquid crystal material was effected in the liquid crystal panel of Comparative Example 1-2, black light irradiation was performed. When black light irradiation was continued until the peak attributable to the polyfunctional monomer ma was no longer observable as described above, the irradiation time of black light had come to 30 minutes for the liquid crystal panel of Example 1, whereas the irradiation time was 2 hours for the liquid crystal panel of Comparative Example 1-2.

In producing the liquid crystal panel of Comparative Example 1-3, the polyfunctional monomer ma was not mixed in the liquid crystal material, but the polyfunctional monomer mb represented by structural formula (1a) was mixed in the alignment film material, and a thermal polymerization was carried out. As a result, the liquid crystal panel of Comparative Example 1-3 did not have any alignment sustaining layers, but the alignment films contained the polymerization product.

Next, a voltage of 1 V was applied to each of the liquid crystal panels of Comparative Examples 1-1, 1-2, 1-3, and Example 1 at 70° C., and their initial VHRs were measured. The initial VHR was 99% for the liquid crystal panel of Comparative Examples 1-1, 1-3, and Example 1, whereas the initial VHR was 98% for the liquid crystal panel of Comparative Example 1-2. Since it is considered that an initial VHR of 99% or more is necessary for ensuring long-term reliability, the liquid crystal panel of Comparative Example 1-2 did not provide a satisfactory value.

Moreover, the residual DC voltage was measured by flicker minimizing method. After applying a DC offset voltage of 2 V at 40° C., a residual DC voltage measurement was taken. The liquid crystal panel of Comparative Example 1-1 had a residual DC voltage of +150 mV; the liquid crystal panel of Comparative Example 1-2 had a residual DC voltage of +90 mV; and the liquid crystal panels of Comparative Example 1-3 and Example 1 had a residual DC voltage of −20 mV.

Although the liquid crystal panel of Comparative Example 1-1 had a relatively good initial VHR, its residual DC voltage was very high. In the liquid crystal panel of Comparative Example 1-2, it is presumable from its initial VHR and residual DC voltage results that, since the alignment films did not contain the polymerization product, a portion of the alignment films dissolved into the liquid crystal layer as impurities during light irradiation.

Moreover, the resultant liquid crystal panels of Comparative Examples 1-1, 1-2, 1-3, and Example 1 were subjected to a power-on test of continuously applying a voltage of ±10 V with a frequency of 60 Hz at 40° C., and thereafter an amount of change in the tilt angle was measured.

Figure 9:
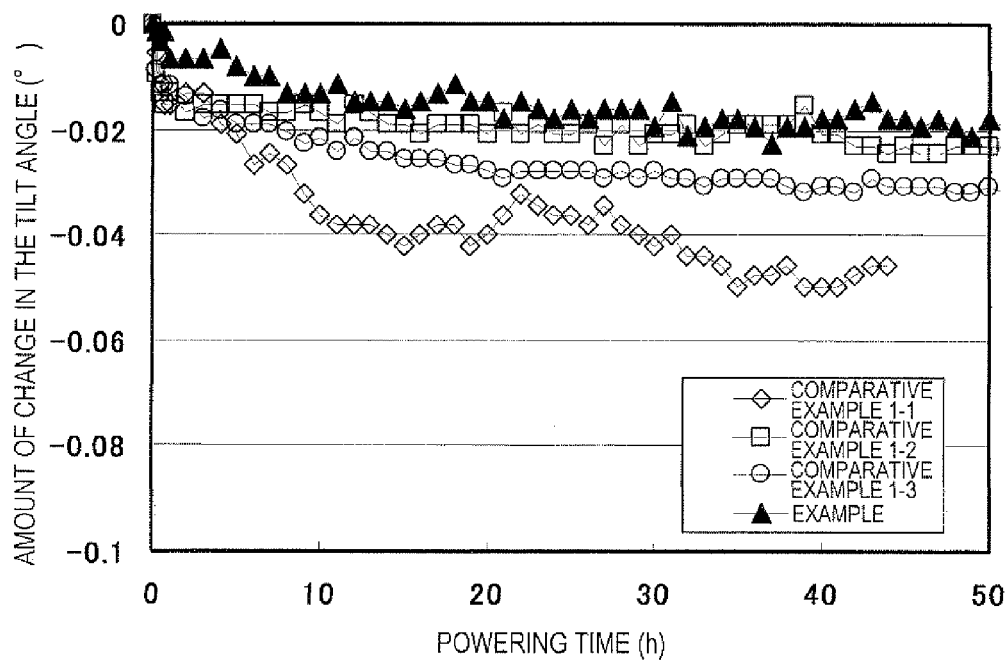
FIG. 9 A graph showing amounts of change in the pretilt angle against powering time.

FIG. 9 is a graph showing amounts of change in the tilt angle against powering time, with respect to the liquid crystal panels of Comparative Examples 1-1, 1-2, 1-3, and Example 1. Herein, a comparison between the results of the liquid crystal panels of Comparative Examples 1-1, 1-2, and 1-3 indicates that: in the liquid crystal panel of Comparative Example 1-1, the amount of change in the pretilt angle increased as the powering time increased; however, in the liquid crystal panels of Comparative Examples 1-2 and 1-3, the increase in the amount of change in the pretilt angle was suppressed even when the powering time increased. This is presumably because the pretilt angle of the liquid crystal molecules was maintained due to the upper polymerization product poa, into which the polyfunctional monomer ma mixed in the liquid crystal material had polymerized, or the lower polymerization product pob, into which the polyfunctional monomer mb mixed in the alignment film material had polymerized. Note that the effect provided by the upper polymerization product poa was greater than the effect provided by the lower polymerization product pob.

Furthermore, a comparison between the results of the liquid crystal panels of Comparative Examples 1-2, 1-3, and Example 1 indicates that the amount of change in the pretilt angle of the liquid crystal panel of Example 1, which contained both the upper polymerization product poa and the lower polymerization product pob, was slightly smaller than those of the liquid crystal panels of Comparative Examples 1-2 and 1-3. Thus, the amount of change in the pretilt angle was improved in the liquid crystal panel of Example 1.

Example 2

Hereinafter, with reference to FIG. 1, FIG. 6, and FIG. 8, a liquid crystal display device of Example 2 will be described. The liquid crystal display device of Example 2 also operates in the RTN mode.

First, on a principal face of the first insulative substrate 222, although not shown in the figures, TFTs and wiring lines connected to the TFTs, and an insulating layer and the like were formed, upon which the pixel electrodes 224 were formed. Similarly, on a principal face of the second insulative substrate 242, although not shown in the figures, a colored layer having color filters, and an insulating layer and the like were formed, upon which the counter electrode 244 was formed.

Next, an alignment film material was prepared. The alignment film material was obtained by allowing a precursor (polyamic acid) of the polyimide pi to be dissolved in a solvent, and thereafter allowing the polyfunctional monomer mb and a cross-linker to be further dissolved therein. The precursor of the polyimide pi was the polyamic acid (AL60101 manufactured by JSR Corporation) represented by structural formula (3b'). The polyfunctional monomer mb was biphenyldimethacrylate as represented by structural formula (1a). The cross-linker was an epoxy-type cross-linker represented by structural formula (4).

First, the alignment film material was applied on the pixel electrodes 224. The application of the alignment film material was performed by a printing technique, ink jet technique, or spin coating technique. As a first heat treatment (pre-bake), one minute of heating was conducted at 90° C. to remove the solvent to a certain extent; and furthermore, 40 minutes of heating was conducted at 200° C. as a second heat treatment (post-bake). Through such heat treatments, the first alignment film 110 containing the polyimide pi, into which the polyamic acid had imidized, and the polymerization product pob, into which the polyfunctional monomer mb had polymerized, was formed. The fraction of imide units of the polyimide pi was about 50%. Thereafter, a principal face of the first alignment film 110 was subjected to a rubbing treatment. Similarly, the aforementioned alignment film material was applied to form the second alignment film 120 on the counter electrode 244, and a rubbing alignment treatment was performed.

Next, the active matrix substrate 220 and the counter substrate 240 were attached together so that the first alignment film 110 and the second alignment film 120 opposed each other and that the angle between the alignment treatment direction PD1 of the first alignment film and the alignment treatment direction PD3 of the second alignment film was 90°, and fixed so that the interspace between the active matrix substrate 220 and the counter substrate 240 was about 4 μm. Specifically, after applying a seal onto the active matrix substrate 220 and scattering beads over the counter substrate 240, the active matrix substrate 220 and the counter substrate 240 were attached together.

Next, the polyfunctional monomer ma represented by structural formula (2a) was mixed in a nematic liquid crystal material having negative dielectric anisotropy. The concentration of the polyfunctional monomer ma on the basis of the liquid crystal material was 0.6 wt %. Then, the liquid crystal material was injected between the active matrix substrate 220 and the counter substrate 240, and a heating-quenching was performed at 130° C.

Thereafter, black light irradiation was performed to form a polymerization product of the polyfunctional monomer ma. If any polyfunctional monomer ma remains in the liquid crystal material, the voltage holding ratio and residual DC voltage will be deteriorated. Therefore, the black light irradiation was continued until the peak attributable to the polyfunctional monomer ma was no longer observable by gas chromatography, thus reducing the polyfunctional monomer ma mixed in the liquid crystal material. In this manner, the liquid crystal panel of Example 2 was produced.

Moreover, three liquid crystal panels were produced for the sake of comparison. In producing a liquid crystal panel of Comparative Example 2-1, the polyfunctional monomer ma was not mixed in the liquid crystal material, and the polyfunctional monomer mb was not mixed in the alignment film material although a cross-linker was added thereto. As a result, the liquid crystal panel of Comparative Example 2-1 did not have any alignment sustaining layers, and its alignment films did not contain the polymerization product. In the liquid crystal panel of Comparative Example 2-1, since the monomer within the liquid crystal material was not subjected to polymerization, black light irradiation was not performed.

In producing a liquid crystal panel of Comparative Example 2-2, the polyfunctional monomer ma represented by structural formula (2a) was mixed in the liquid crystal material and a photopolymerization was carried out, but the polyfunctional monomer mb was not mixed in the alignment film material although a cross-linker was added thereto. As a result, the alignment films of the liquid crystal panel of Comparative Example 2-2 did not contain the polymerization product. Since polymerization of the monomer within the liquid crystal material was effected in the liquid crystal panel of Comparative Example 2-2, black light irradiation was performed. When black light irradiation was continued until the peak attributable to the polyfunctional monomer ma was no longer observable as described above, the irradiation time of black light had come to 30 minutes for the liquid crystal panel of Example 2, whereas the irradiation time was 2 hours for the liquid crystal panel of Comparative Example 2-2.

In producing the liquid crystal panel of Comparative Example 2-3, the polyfunctional monomer ma was not mixed in the liquid crystal material, but the polyfunctional monomer mb represented by structural formula (1a) and a cross-linker were mixed in the alignment film material, and a thermal polymerization was carried out. As a result, the liquid crystal panel of Comparative Example 2-3 did not have any alignment sustaining layers, but the alignment films contained the polymerization product.

Next, a voltage of 1 V was applied to each of the liquid crystal panels of Comparative Examples 2-1, 2-2, 2-3, and Example 2 at 70° C., and their initial VHRs were measured. The initial VHR was 99% for the liquid crystal panels of Comparative Examples 2-1, 2-3, and Example 2, whereas the initial VHR was 97% for the liquid crystal panel of Comparative Example 2-2. Thus, the liquid crystal panel of Comparative Example 2-2 did not provide a satisfactory value.

Moreover, the residual DC voltage was measured by flicker minimizing method. After applying a DC offset voltage of 2 V at 40° C., a residual DC voltage measurement was taken. The liquid crystal panels of Comparative Examples 2-1, 2-3, and Example 2 had a residual DC voltage of −10 my, whereas the liquid crystal panel of Comparative Example 2-2 had a residual DC voltage of a +60 mV. It is presumable in the liquid crystal panel of Comparative Example 2-1 that the residual DC voltage was relatively low because of the cross-linker within the alignment films. In the liquid crystal panel of Comparative Example 2-2, it is presumable from its initial VHR and residual DC voltage results that, since the alignment films did not contain the polymerization product, a portion of the alignment films dissolved into the liquid crystal layer as impurities during light irradiation.

Moreover, the resultant liquid crystal panels of Comparative Examples 2-1, 2-2, 2-3, and Example 2 were subjected to a power-on test of continuously applying a voltage of ±10 V with a frequency of 60 Hz at 40° C., and thereafter an amount of change in the tilt angle was measured.

Figure 10:
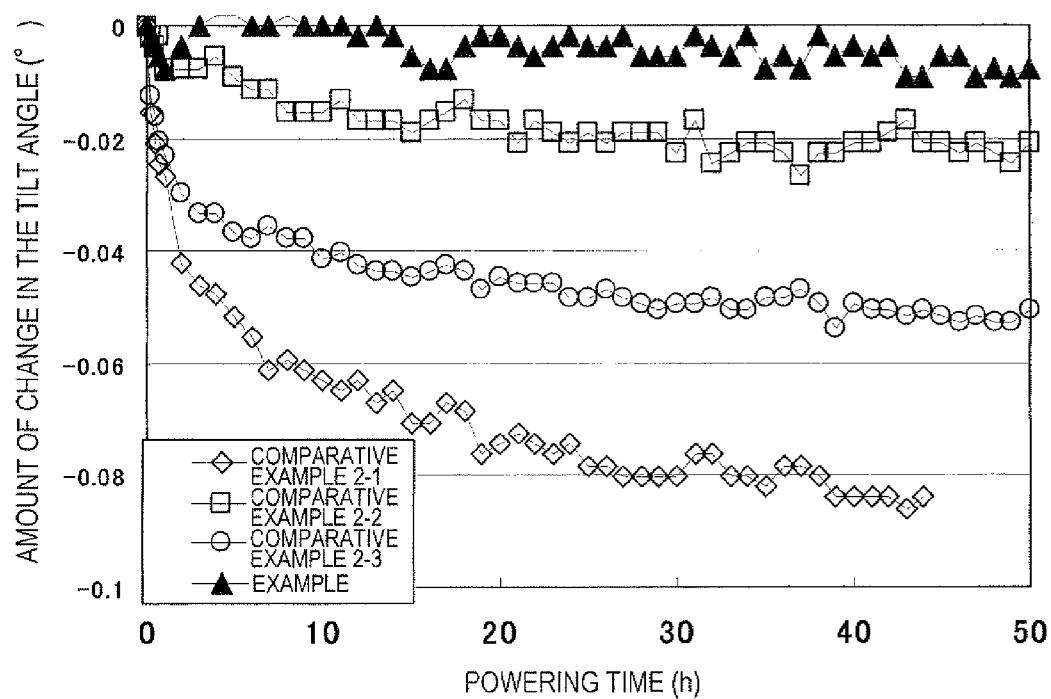
FIG. 10 A graph showing amounts of change in the pretilt angle against powering time.

FIG. 10 is a graph showing amounts of change in the tilt angle against powering time, with respect to the liquid crystal panels of Comparative Examples 2-1, 2-2, 2-3, and Example 2. Herein, a comparison between the results of the liquid crystal panels of Comparative Examples 2-1, 2-2, and 2-3 indicates that: in the liquid crystal panel of Comparative Example 2-1, the amount of change in the pretilt angle increased as the powering time increased; however, in the liquid crystal panels of Comparative Examples 2-2 and 2-3, the increase in the amount of change in the pretilt angle was suppressed even when the powering time increased. This is presumably because the pretilt angle of the liquid crystal molecules was maintained due to the upper polymerization product poa, into which the polyfunctional monomer ma mixed in the liquid crystal material had polymerized, or the lower polymerization product pob, into which the polyfunctional monomer mb mixed in the alignment film material had polymerized. Note that the effect provided by the upper polymerization product poa was greater than the effect provided by the lower polymerization product pob.

Furthermore, a comparison between the results of the liquid crystal panels of Comparative Examples 2-2, 2-3, and Example 2 indicates that the amount of change in the pretilt angle of the liquid crystal panel of Example 2, which contained both the upper polymerization product poa and the lower polymerization product pob, was smaller than those of the liquid crystal panels of Comparative Examples 2-2 and 2-3. Thus, the amount of change in the pretilt angle was improved in the liquid crystal panel of Example 2.

For reference sake, the entire disclosure of Japanese Patent Application No. 2008-303176, on which the present application claims priority, is incorporated herein by reference.

INDUSTRIAL APPLICABILITY

A liquid crystal display device according to the present invention is able to suppress image sticking caused by changes in the pretilt angle. Moreover, a liquid crystal display device according to the present invention is suitably used not only for liquid crystal television sets, but also for DIDs (Digital Information Displays).

REFERENCE SIGNS LIST 100 liquid crystal display device
110 first alignment film
pi polyimide
pob lower polymerization product
120 second alignment film
210 first alignment sustaining layer
poa upper polymerization product
220 active matrix substrate
222 first insulative substrate
224 pixel electrode
230 second alignment sustaining layer
240 counter substrate
242 second insulative substrate
244 counter electrode
260 liquid crystal layer
262 liquid crystal molecules

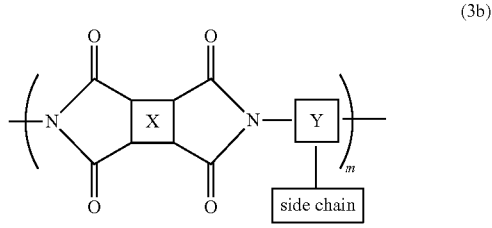

-continued
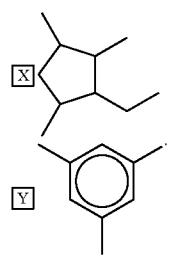

The invention claimed is:

1. A liquid crystal display device comprising:
an active matrix substrate having a pixel electrode;
a counter substrate having a counter electrode;
vertical-alignment type liquid crystal layer provided between the active matrix substrate and the counter substrate; and
alignment sustaining layers provided between the active matrix substrate and the liquid crystal layer and between the counter substrate and the liquid crystal layer, the alignment sustaining layers containing a polymerization product resulting from polymerization of a polyfunctional monomer, wherein,
at least one of the active matrix substrate and the counter substrate further includes an alignment film;
the alignment film contains polyimide and a polymerization product resulting from polymerization of another polyfunctional monomer;
wherein the polyfunctional monomer of the polymerization product contained in the alignment film is represented by general formula (1) Pb1-Ab1-(Zb1-Ab2)n-Pb2 (in general formula (1), Pb1 and Pb2 are, independently, acrylate, methacrylate, acrylamide, or methacrylamide; Ab1 and Ab2 represent, independently, 1,4-phenylene, 1,4-cyclohexane or 2,5-thiophene, or naphthalene-(2,6)-diyl or anthracene-(2,7)-diyl; and Zb1 is a —COO— group, a —OCO— group, a —O— group, a —CONH— group or a single bond, where n is 0 or 1); and wherein at least one of Ab1 and Ab2 is substituted by at least one fluorine group.

2. The liquid crystal display device of claim 1, wherein the polyfunctional monomer of the polymerization product contained in the alignment film has a plurality of vinyl groups.

3. The liquid crystal display device of claim 1, wherein the polyfunctional monomer of the polymerization product contained in the alignment film includes a dimethacrylate monomer.

4. The liquid crystal display device of claim 3, wherein the dimethacrylate monomer is represented by structural formula (1a)

[Formula 1]

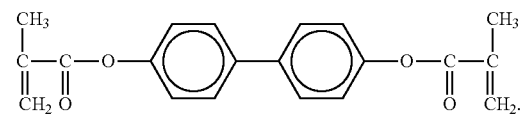

5. The liquid crystal display device of claim 1, wherein the polyfunctional monomer of the polymerization product contained in the alignment sustaining layers has a plurality of vinyl groups.

6. The liquid crystal display device of claim 5, wherein the polyfunctional monomer of the polymerization product contained in the alignment sustaining layers is represented by general formula (2) Pa1-Aa1-(Za1-Aa2)n-Pa2 (in general formula (2), Pa1 and Pa2 are, independently, acrylate, methacrylate, acrylamide, or methacrylamide; Aa1 and Aa2 represent, independently, 1,4-phenylene, 1,4-cyclohexane or 2,5-thiophene, or naphthalene-(2,6)-diyl or anthracene-(2,7)-diyl; and Za1 is a —COO— group, a —OCO—group, a —O— group, a —CONH— group or a single bond, where n is 0 or 1).

7. The liquid crystal display device of claim 1, wherein the polyimide is a polyimide including a structure represented by general formula (3)

[Formula 3]

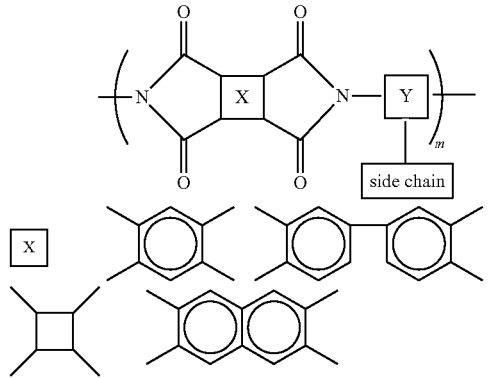

-continued

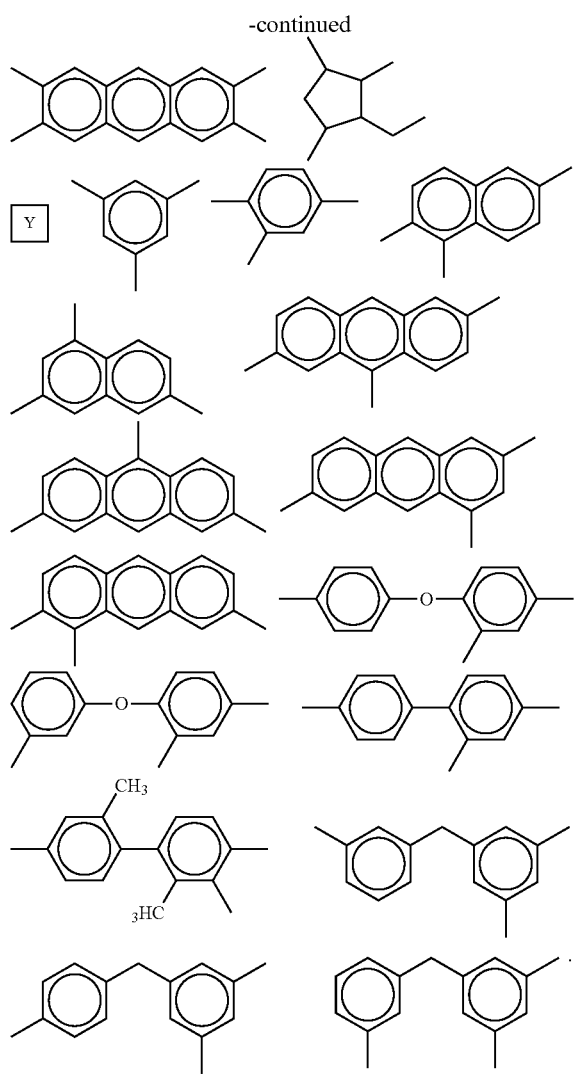

8. The liquid crystal display device of claim 7, wherein the polyimide has a photoreactive functional group.

9. The liquid crystal display device of claim 8, wherein the photoreactive functional group is one selected from the group consisting of a cinnamate group, a chalcone group, a tolan group, a coumarin group, and an azobenzene group.

10. The liquid crystal display device of claim 1, wherein the alignment film regulates liquid crystal molecules in the liquid crystal layer so that the liquid crystal molecules are inclined with respect to a normal direction of a principal face of the alignment film in the absence of an applied voltage.

11. The liquid crystal display device of claim 1, wherein, the liquid crystal display device has a plurality of pixels; and
in each of the plurality of pixels, the liquid crystal layer has a plurality of liquid crystal domains having respectively different reference alignment azimuths.

12. The liquid crystal display device of claim 11, wherein the plurality of liquid crystal domains are four liquid crystal domains.

13. A liquid crystal display device comprising:
an active matrix substrate having a pixel electrode;
a counter substrate having a counter electrode;
a vertical-alignment type liquid crystal layer provided between the active matrix substrate and the counter substrate; and
alignment sustaining layers provided between the active matrix substrate and the liquid crystal layer and between the counter substrate and the liquid crystal layer, the alignment sustaining layers containing a polymerization product resulting from polymerization of a polyfunctional monomer, wherein,
at least one of the active matrix substrate and the counter substrate further includes an alignment film;
the alignment film contains polyimide and a polymerization product resulting from polymerization of another polyfunctional monomer;
wherein the polyfunctional monomer of the polymerization product contained in the alignment sustaining layers has a plurality of vinyl groups;
wherein the polyfunctional monomer of the polymerization product contained in the alignment sustaining layers is represented by general formula (2) Pa1-Aa1-(Za1-Aa2)n-Pa2 (in general formula (2), Pa1 and Pa2 are, independently, acrylate, methacrylate, acrylamide, or methacrylamide; Aa1 and Aa2 represent, independently, 1,4-phenylene, 1,4-cyclohexane or 2,5-thiophene, or naphthalene-(2,6)-diyl or anthracene-(2,7)-diyl;
and Za1 is a —COO— group, a —OCO— group, a —O— group, a —CONH— group or a single bond, where n is 0 or 1); and
wherein at least one of Aa1 and Aa2 is substituted by at least one fluorine group.

14. The liquid crystal display device of claim 13, wherein the polyfunctional monomer of the polymerization product contained in the alignment sustaining layers includes a dimethacrylate monomer.

15. The liquid crystal display device of claim 14, wherein the dimethacrylate monomer is represented by structural formula (2a)

[Formula 2]

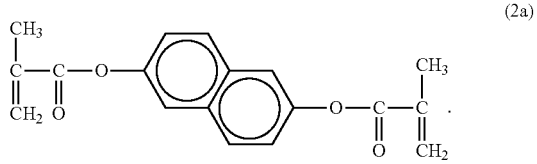
(2a)

16. A liquid crystal display device comprising:
an active matrix substrate having a pixel electrode;
a counter substrate having a counter electrode;
a vertical-alignment type liquid crystal layer provided between the active matrix substrate and the counter substrate; and
alignment sustaining layers provided between the active matrix substrate and the liquid crystal layer and between the counter substrate and the liquid crystal layer, the alignment sustaining layers containing a polymerization product resulting from polymerization of a polyfunctional monomer, wherein,
at least one of the active matrix substrate and the counter substrate further includes an alignment film;
the alignment film contains polyimide and a polymerization product resulting from polymerization of another polyfunctional monomer; wherein the polyimide is a polyimide including a structure represented by general formula (3)

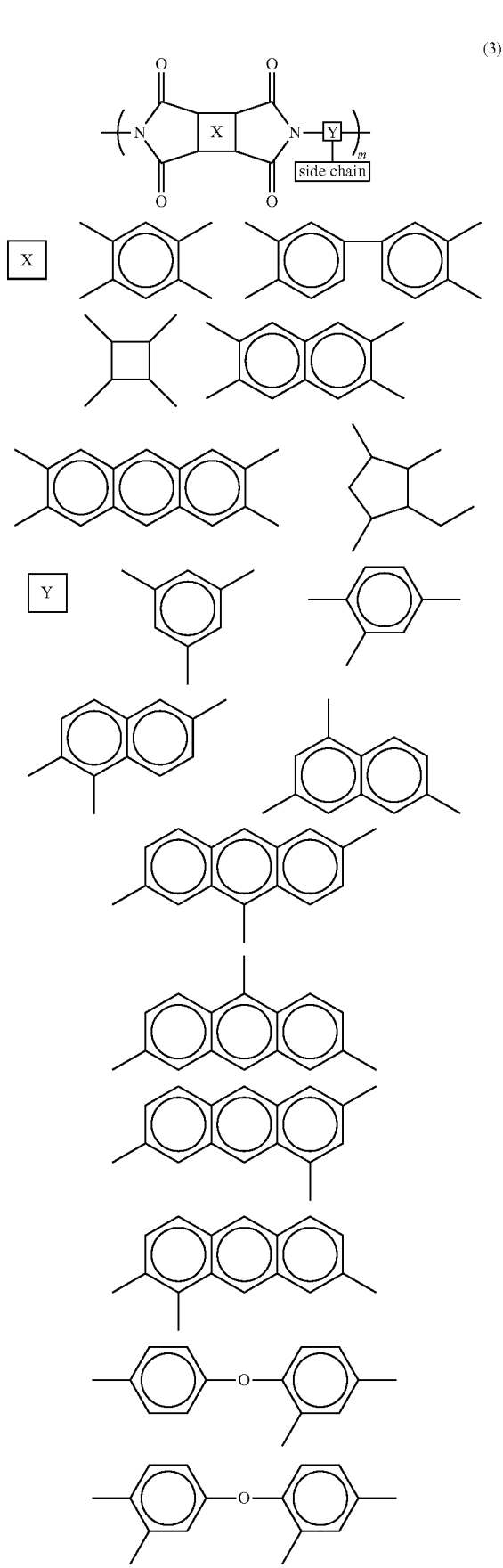
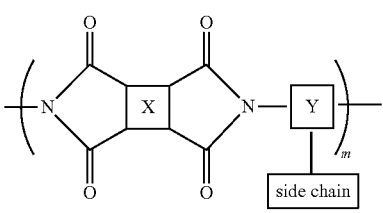
wherein the polyimide has a photoreactive functional group;
wherein the polyimide is a polyimide including a structure represented by structural formula (3a)
[Formula 4]
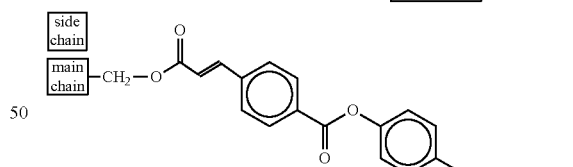
17. The liquid crystal display device of claim 16, wherein the polyimide has a vertical alignment group in a side chain thereof.

18. A liquid crystal display device comprising:

an active matrix substrate having a pixel electrode;

a counter substrate having a counter electrode;

a vertical-alignment type liquid crystal layer provided between the active matrix substrate and the counter substrate; and alignment sustaining layers provided between the active matrix substrate and the liquid crystal layer and between the counter substrate and the liquid crystal layer, the alignment sustaining layers containing a polymerization product resulting from polymerization of a polyfunctional monomer, wherein, at least one of the active matrix substrate and the counter substrate further includes an alignment film;

the alignment film contains polyimide and a polymerization product resulting from polymerization of another polyfunctional monomer;

wherein the polyimide is a polyimide including a structure represented by general formula (3)

[Formula 3]

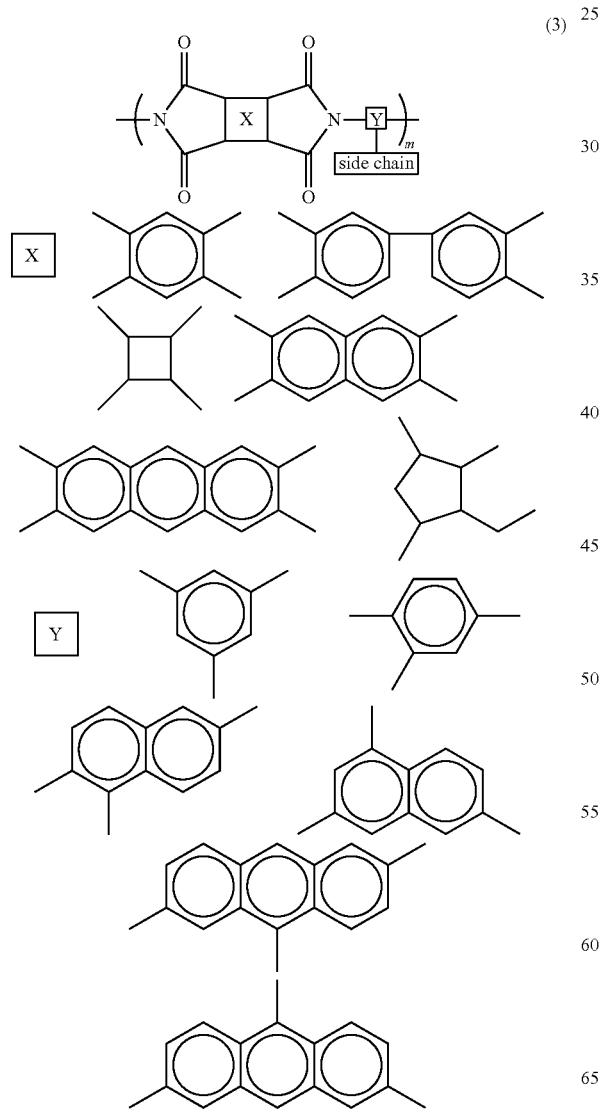

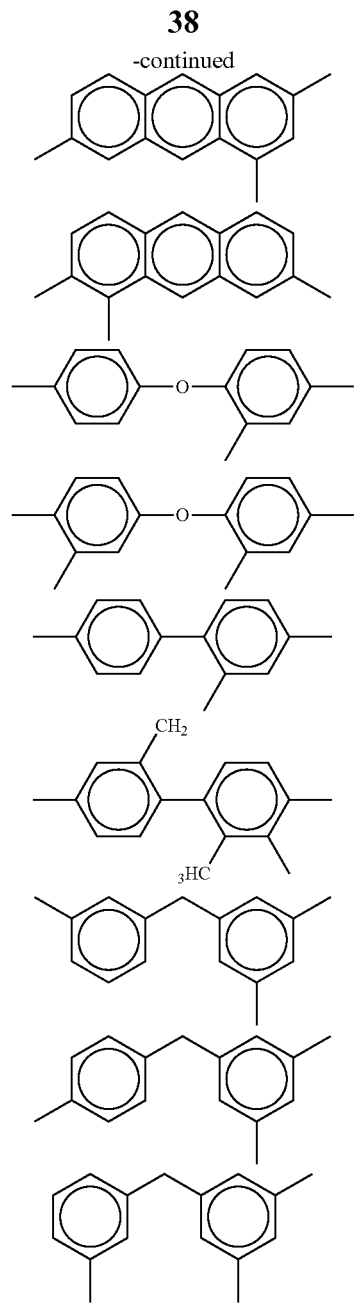

wherein the polyimide has a vertical alignment group in a side chain thereof;

wherein the polyimide is a polyimide including a structure represented by structural formula (3b)

[Formula 5]